(12) United States Patent
Naruto et al.

(10) Patent No.: US 7,879,260 B2
(45) Date of Patent: Feb. 1, 2011

(54) ADDITIVE FOR ANODE MATERIAL FOR LITHIUM SECONDARY BATTERY, ANODE MATERIAL FOR LITHIUM SECONDARY BATTERY, ANODE AND LITHIUM SECONDARY BATTERY USING THE ANODE MATERIAL FOR LITHIUM SECONDARY BATTERY

(75) Inventors: Toshiya Naruto, Kanagawa (JP); Akira Matsumoto, Kanagawa (JP); Iwao Soga, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1002 days.

(21) Appl. No.: 11/085,494

(22) Filed: Mar. 22, 2005

(65) Prior Publication Data

US 2005/0221184 A1     Oct. 6, 2005

Related U.S. Application Data

(63) Continuation of application No. PCT/JP03/12360, filed on Sep. 26, 2003.

(30) Foreign Application Priority Data

Oct. 4, 2002    (JP) ............................ 2002-292747
May 8, 2003    (JP) ............................ 2003-130405

(51) Int. Cl.
*H01B 1/04* (2006.01)
*H01M 4/58* (2010.01)
*C01B 31/02* (2006.01)

(52) U.S. Cl. ................. 252/502; 423/445 B; 429/231.8

(58) Field of Classification Search ............. 423/445 B; 502/502
See application file for complete search history.

(56) References Cited

U.S. PATENT DOCUMENTS 5,324,495 A    6/1994    Gorum (Continued)

FOREIGN PATENT DOCUMENTS

EP    0 571 858    1/1993

(Continued)

OTHER PUBLICATIONS

Periodic Table of the Elements, National Institute of Standards and Technology, accessed at http://physics.nist.gov/PhysRefData/PerTable/periodic-table.pdf.*

(Continued)

*Primary Examiner*—Stuart L. Hendrickson
*Assistant Examiner*—Daniel C. McCracken
(74) *Attorney, Agent, or Firm*—Oblon, Spivak, McClelland, Maier & Neustadt, L.L.P.

(57) ABSTRACT

An object of the invention is to provide such an additive for a lithium secondary battery that improves the battery capacity and the initial efficiency of the lithium secondary battery.

In the invention, a fullerene derivative having a group having a formula weight of 6 or more is used as an additive for a lithium secondary battery. A fullerene derivative having a group having a formula weight of 6 or more is contained in an anode material for a lithium secondary battery, an anode for a lithium secondary battery, and a lithium secondary battery using an anode containing the anode material. The group having a formula weight of 6 or more in the fullerene derivative is preferably one selected from the group consisting of an alkali metal atom, a chalcogen atom, a halogen atom, an aliphatic hydrocarbon group, an aromatic hydrocarbon group, a heterocyclic group, a characteristic group containing oxygen, a characteristic group containing sulfur and a characteristic group containing nitrogen.

21 Claims, 2 Drawing Sheets

U.S. PATENT DOCUMENTS

| | | | |
|---|---|---|---|
| 5,338,571 A | | 8/1994 | Mirkin et al. |
| 5,648,523 A | * | 7/1997 | Chiang ................. 562/100 |
| 5,994,410 A | | 11/1999 | Chiang et al. |
| 7,371,479 B2 | * | 5/2008 | Nuber ................. 429/33 |
| 2002/0182506 A1 | * | 12/2002 | Cagle ................. 429/231.8 |

FOREIGN PATENT DOCUMENTS

| | | |
|---|---|---|
| EP | 1 199 281 | 4/2002 |
| EP | 1 354 864 | 10/2003 |
| GB | 2 376 129 | 4/2002 |
| JP | 5-82132 | 4/1993 |
| JP | 5-275083 | 10/1993 |
| JP | 5-290887 | 11/1993 |
| JP | 5-314977 | 11/1993 |
| JP | 5-325974 | 12/1993 |
| JP | 6-342655 | 12/1994 |
| JP | 7-296799 | 11/1995 |
| JP | 7-320725 | 12/1995 |
| JP | 10-74518 | 3/1998 |
| JP | 2002-193861 | 7/2002 |
| WO | WO 00/31811 | 6/2000 |
| WO | WO 02/051782 * | 7/2002 |

OTHER PUBLICATIONS

Wang, et al., Fullerene-derived star-burst conjugated polymers, Synthetic Metals 1999; 103: 2350-2353.*

Periodic Table of Elements.*

Ruoff et al, J. Phys. Chem. 1993, 97, 3379-3383.

Loutfy et al, Perspectives of Fullerene Nanotechnology, 2002, pp. 357-367 XP 008103790.

* cited by examiner

ADDITIVE FOR ANODE MATERIAL FOR LITHIUM SECONDARY BATTERY, ANODE MATERIAL FOR LITHIUM SECONDARY BATTERY, ANODE AND LITHIUM SECONDARY BATTERY USING THE ANODE MATERIAL FOR LITHIUM SECONDARY BATTERY

CROSS REFERENCE TO RELATED APPLICATIONS

This application is a continuation of PCT/JP03/012360, filed on Sep. 26, 2003, and claims priority to the following applications: Japanese Patent Application No. 2002-292747, filed on Oct. 4, 2002, and Japanese Patent Application No. 2003-130405, filed on May 8, 2003.

FIELD OF THE INVENTION

The present invention relates to an additive for a prescribed anode material for a lithium secondary battery. The invention also relates to a anode material for a lithium secondary battery containing a carbonaceous substance having on a surface thereof a fullerene derivative having a group having a formula weight of 6 or more, an anode material for a lithium secondary battery containing a carbonaceous substance having on a surface thereof a fullerene compound having spherical shell structures crosslinked through at least one atom, or an anode material for a lithium secondary battery containing a carbonaceous substance having on a surface thereof a fullerene compound having a spherical shell structure chemically bonded to the carbonaceous substance through at least one atom. The invention further relates to an anode and a lithium secondary battery using the anode material for a lithium secondary battery.

The invention still further relates to a process for producing the anode material.

BACKGROUND ART

After establishing the mass production process of $C_{60}$ in 1990, studies on fullerene have been extensively made, and various kinds of derivatives of fullerene have been synthesized and studied for possibilities of practical applicability thereof.

One of the fields among the practical applications of fullerene is a battery. Examples of the battery include a lithium secondary battery. A lithium secondary battery has a high energy density owing to the small atomic weight of lithium, and is used as an electric power source of such an electric equipment as a portable telephone and a personal digital assistant (PDA).

Examples of the technique using fullerene hydride obtained by adding hydrogen to fullerene as an additive for a carbon anode (International Application No. 00/31811). According to the investigations made by the inventors, however, it has been found that fullerene hydride is instable and has a tendency of being decomposed in a solvent, and thus cannot be added to a carbon anode stably, whereby the battery capacity is liable to become insufficient or instable.

DISCLOSURE OF THE INVENTION

According to the establishment of wire and wireless high-speed communication technologies for large-volume data, such as video communication among PDAs and portable telephones, in recent years, there is such a tendency that the consumption electric power of these equipments is increased. As a result, there is a strong demand for increasing the battery capacity of a lithium secondary battery used as an electric power source therefor.

The inventors have made continued investigations to attain a lithium secondary battery having a large capacity by utilizing the nature of fullerene as an electron acceptor. As a result, it has been found that the initial efficiency on charging and discharging a lithium secondary battery can be improved by making a fullerene compound on a surface of a carbonaceous substance used as an anode active material of a lithium secondary battery, whereby the battery capacity can be improved, and thus the invention has been completed.

More specifically, it has been found that upon making a fullerene compound present on a surface of a carbonaceous substance, in the case where the fullerene compound is present in a monomolecular form or as an aggregated body of molecules, the initial efficiency on charging and discharging a lithium secondary battery can be improved by using, as an additive, such a fullerene derivative that has a group having a particular formula weight bonded to the spherical shell structure formed of carbon.

It has also found that upon making a fullerene compound present on a surface of a carbonaceous substance, the fullerene compound can be firmly present on the surface of the carbonaceous substance by crosslinking spherical shell structures of the fullerene compound through at least one atom, whereby the initial efficiency on charging and discharging a lithium secondary battery can be improved.

It has further found that upon making a fullerene compound present on a surface of a carbonaceous substance, the fullerene compound can be firmly present on the surface of the carbonaceous substance by chemically bonding a spherical shell structure of the fullerene compound to the carbonaceous substance through at least one atom, whereby the initial efficiency on charging and discharging a lithium secondary battery can be improved.

Accordingly, a first substance of the invention resides in an additive for an anode material for a lithium secondary battery, characterized in that the additive is a fullerene compound having a group having a formula weight of 6 or more.

A second substance of the invention resides in an anode material for a lithium secondary battery, the anode material containing a fullerene compound and a carbonaceous substance, characterized in that the fullerene compound is a fullerene derivative having a group having a formula weight of 6 or more, and the fullerene compound is present on a surface of the carbonaceous substance.

A third substance of the invention resides in an anode material for a lithium secondary battery, the anode material containing a fullerene compound and a carbonaceous substance, characterized in that the fullerene compound is present on a surface of the carbonaceous substance, and spherical shell structures of the fullerene compound are crosslinked through at least one atom.

A fourth substance of the invention resides in an anode material for a lithium secondary battery, the anode material containing a fullerene compound and a carbonaceous substance, characterized in that the fullerene compound is present on a surface of the carbonaceous substance, and a spherical shell structure of the fullerene compound is chemically bonded to the carbonaceous substance through at least one atom.

A fifth substance of the invention resides in an anode material for a lithium secondary battery, the anode material containing a fullerene compound and a carbonaceous substance, characterized in that the fullerene compound is present on a surface of the carbonaceous substance, and an elution amount of the fullerene compound per unit weight of the anode material for a lithium secondary battery determined by the following test method is 2 mg/g or less:

[Test Method]
(1) 0.1 g of the anode material for a lithium secondary battery is dissolved in 2 mL of a trimethylbenzene solvent or an N-methylpyrrolidone solvent to prepare a sample solution;
(2) the sample solution is allowed to stand at an ordinary temperature (25±5° C.) and an ordinary humidity (50±15% RH) for 24 hours;
(3) a supernatant fluid of the sample solution thus allowed to stand is recovered, and a content of the fullerene compound contained in the supernatant fluid is measured; and
(4) the measured value is converted to a total elution amount of the sample solution, and the converted value is divided by 0.1 g.

A sixth substance of the invention resides in an anode for a lithium secondary battery, characterized by containing the aforementioned anode material for a lithium secondary battery.

A seventh substance of the invention resides in a lithium secondary battery, characterized by using the aforementioned anode.

An eighth substance of the invention resides in a process for producing an anode material for a lithium secondary battery having a fullerene compound present on a surface of a carbonaceous substance, characterized in that the process contains: a fullerene compound supporting step of making a fullerene compound present on a surface of a carbonaceous substance; and at least one of a crosslinking step of crosslinking spherical shell structures of the fullerene compound through at least one atom, and a chemically bonding step of chemically bonding a spherical shell structure of the fullerene compound to the surface of the carbonaceous substance through at least one atom.

The "fullerene compound" referred in the invention means a substance having at least a spherical shell structure formed of carbon in the molecule thereof. The "fullerene compound" comprehensively includes, for example, fullerene as a carbon molecule in a spherical shell form, a fullerene derivative having an organic group or a group of an inorganic element bonded to carbon constituting fullerene, such a state that spherical shell structures constituting fullerene or a fullerene derivative are bonded directly or through at least one atom, and such a state that a spherical shell structure constituting fullerene or a fullerene derivative is chemically bonded to a surface of a carbonaceous substance. Herein, carbon may be lost in a part or the spherical shell structure constituting fullerene or the fullerene compound, and a part of the spherical shell structure constituting fullerene or the fullerene compound may be broken.

The state where "a fullerene compound is present on a surface of a carbonaceous substance" referred in the invention, for example, includes such a case that a molecule of fullerene or a fullerene derivative is adsorbed on a surface of a carbonaceous substance in a single molecular state or an aggregated form, such a case that fullerene and/or fullerene derivatives are bonded to each other directly or indirectly through a prescribed group and are adsorbed on a surface of a carbonaceous substance, and such a case that fullerene and/or a fullerene derivative is chemically bonded to a surface of a carbonaceous substance directly or indirectly through a prescribed group.

According to the invention, on a surface of a carbonaceous substance used as an anode active material of a lithium secondary battery, a fullerene compound is present in at least one state of (a) a state of a fullerene derivative having a particular group, (b) such a state that spherical shell structures of fullerene are crosslinked through at least one atom, and (c) such a state that a spherical shell structure of fullerene is chemically bonded to the carbonaceous substance through at least one atom, whereby the initial efficiency on charging and discharging a lithium secondary battery can be significantly improved.

In the case where the spherical shell structures of the fullerene compound are crosslinked through at least one atom on the surface of the carbonaceous substance, and/or the spherical shell structure of fullerene and the surface of the carbonaceous substance are chemically bonded to each other through at least one atom, the bond strength of the fullerene compound on the surface of the carbonaceous substance can be increased. Accordingly, improvement of the initial efficiency on charging and discharging a lithium secondary battery can be stably exerted.

BEST MODE FOR CARRYING OUT THE INVENTION

Figure 1:
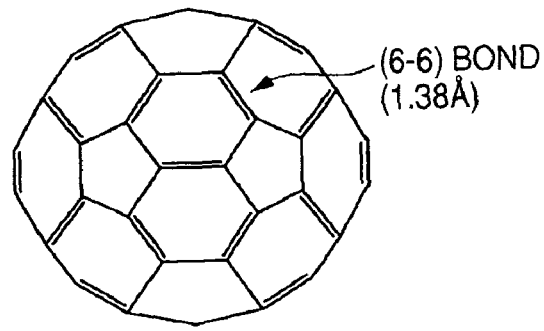
FIG. 1 is a diagram showing a (6-6) bond of $C_{60}$.

In the invention, a fullerene compound is present on a surface of a carbonaceous substance in various forms. The reason why the initial efficiency of a lithium secondary battery is improved, whereby the capacity of the lithium secondary battery is improved by making a fullerene compound present on a surface of a carbonaceous substance is as follows.

In general, at an interface between an anode for a lithium secondary battery mainly containing a carbonaceous substance and an electrolyte, reduction decomposition of the electrolyte (particularly, a solvent for the electrolyte solution) occurs under an electrochemical reducing atmosphere. As a result of the decomposition, an organic substance and a lithium compound as decomposition products form a film called SEI (solid electrolyte layer) on the surface of the carbonaceous substance. The SEI obstructs direct contact between the carbonaceous substance and the electrolyte to terminate substantially the reducing decomposition reaction of the electrolyte, whereby the battery is electrochemically stabilized.

The reaction of forming the SEI almost proceeds in the initial charging process, in which the anode is exposed to an electrochemical reducing state at the first time. However, the electric power consumed by the reducing decomposition during the process of forming the SEI is not accumulated in the active material as energy, and therefore, it cannot be taken out by discharging. In other words, the electric power consumed by forming the SEI out of the electric power put in the initial charging becomes a loss to lower the initial efficiency. The reducing decomposition reaction between the surface of the carbonaceous substance and the electrolyte gradually proceeds after the initial charging, and the reaction brings about deterioration of the storage stability and the cycle characteristics of the lithium secondary battery.

In the invention, the fullerene compound is made directly present on the surface of the carbonaceous substance, which causes occlusion and release of lithium to the electrolyte, so as to improve the initial efficiency of the lithium secondary battery, whereby the capacity is greatly improved. While the functional mechanism thereof is not clear, it is considered that there are such a possibility that the surface of the carbonaceous substance and the electrolyte are prevented from being directly in contact with each other owing to the fullerene compound present between the surface of the carbonaceous substance and the electrolyte to produce an effect equivalent to the case where an SEI is formed from the first, and such a possibility that the efficiency of forming an SEI is improved from the standpoint of reaction and structure owing to the fullerene compound present.

An additive for an anode material for a lithium secondary battery and an anode material for a lithium secondary battery used in the invention, an anode using the anode material for a lithium secondary battery, a lithium secondary battery using the anode, and a process for producing the anode material for a lithium secondary battery will be described.

For convenience of explanation, the anode material for a lithium secondary battery and the process for producing the anode material for a lithium secondary battery are described, and then the anode using the anode material for a lithium secondary battery and the lithium secondary battery are described.

The explanation of the "anode material for a lithium secondary battery" will be made with reference to a case where a fullerene compound is present in a monomolecular form or as an aggregated body of plural molecules on the surface of the carbonaceous substance, as "Embodiment 1".

Subsequently, a case where spherical shell structures of a fullerene compound are crosslinked through at least one atom on the surface of the carbonaceous substance (Embodiment 2), a case where a spherical shell structure of a fullerene compound is chemically bonded to the carbonaceous substance through at least one atom on the surface of the carbonaceous substance (Embodiment 3), and an embodiment using the Embodiment 2 and the Embodiment 3 in combination (Embodiment 4) are described.

Thereafter, an embodiment using the Embodiment 1, the Embodiment 2 and the Embodiment 3 in combination (Embodiment 5) is described.

A. Anode Material for Lithium Secondary Battery

A-1. Embodiment 1

The anode material for a lithium secondary battery in this embodiment is an anode material for a lithium secondary battery containing a carbonaceous substance and a fullerene compound, and is characterized in that the fullerene compound is a fullerene compound having a group having a formula weight of 6 or more, and the fullerene compound is present on the surface of the carbonaceous substance. The embodiment will be described in more detail below.

(1) Additive

In this embodiment, a fullerene derivative having a group having a formula weight of 6 or more is used as an additive for an anode material for a lithium secondary battery. The initial efficiency of the lithium secondary battery can be improved by using the fullerene derivative having a group having a formula weight of 6 or more as an additive for the anode material for a lithium secondary battery. In particular, the initial efficiency of the lithium secondary battery can be improved by making the fullerene derivative having a group having a formula weight of 6 or more present on the surface of the carbonaceous substance.

Examples of fullerene used as the fullerene derivative include the following.

The fullerene is a carbon molecule in a spherical shell form. The fullerene used herein is not limited as far as the object of the invention is satisfied, and examples thereof include $C_{60}$, $C_{70}$, $C_{74}$, $C_{76}$, $C_{78}$, $C_{80}$, $C_{82}$, $C_{84}$, $C_{86}$, $C_{88}$, $C_{90}$, $C_{92}$, $C_{94}$, $C_{96}$, $C_{98}$, $C_{100}$, and a dimer and a trimer of these compounds. Plural kinds of fullerene may be used simultaneously.

In the invention, among these compounds, $C_{60}$, $C_{70}$ and a dimer and a trimer of these compounds are preferred. $C_{60}$ and $C_{70}$ are preferred since they can be easily obtained industrially and have high affinity to the surface of the carbonaceous substance. In the case where these kinds of fullerene are used in combination, it is preferred to use $C_{60}$ and $C_{70}$ in combination. By using the combination, coating on the surface of the carbonaceous substance can be easily attained.

In the case where $C_{60}$ and $C_{70}$ are used in combination, the lower limit of the amount of $C_{70}$ per 100 parts by weight of $C_{60}$ is generally 5 parts by weight or more, preferably 7 parts by weight or more, and particularly preferably 10 parts by weight or more. In the case where $C_{60}$ and $C_{70}$ are used in the aforementioned ratio, the mutual interaction thereof is favorably attained to improve the dispersion stability.

Similarly, the upper limit of the amount of $C_{60}$ per 100 parts by weight of $C_{70}$ is generally 90 parts by weight or less, preferably 80 parts by weight or less, and particularly preferably 70 parts by weight or less. In the case where the content of $C_{70}$ is in the aforementioned ratio, such a problem can be avoided that the effect of the combination use of $C_{60}$ and $C_{70}$ is reduced due to insufficient mutual interaction therebetween.

Fullerene is generally obtained by extraction and separation from a fullerene-containing soot obtained, for example, by the resistance heating method, a laser heating method, an arc discharge method and a combustion method. In this case, it is not necessary that fullerene is completely separated from the soot, and the content of fullerene in the soot can be adjusted in a range that does not impair the performance.

Fullerene is generally in a powder form at an ordinary temperature (25° C.) and an ordinary humidity (50% RH), and the secondary particle diameter thereof is generally 10 nm or more, preferably 15 nm or more, more preferably 20 nm or more, and particularly preferably 50 nm or more, and is generally 1 mm or less, preferably 500 μm or less, and more preferably 100 μm or less.

(Fullerene Derivative Having Formula Weight of 6 or More)

In general, the fullerene derivative means such a compound that an atomic group forming a part of an organic compound or an atomic group of inorganic elements is bonded to at least one carbon atoms constituting the fullerene. Examples of the fullerene derivative include fullerene hydride, fullerene oxide, fullerene hydroxide and fullerene halogenide (such as F, Cl, Br and I).

In the Embodiment 1, such a fullerene derivative is preferably used that groups having a formula weight of 6 or more are bonded to 1 or more of carbon atoms constituting fullerene. Among the carbon atoms constituting fullerene, preferred examples thereof, to which the groups having a formula weight of 6 or more are bonded, include, as a $C_{60}$ molecule is exemplified, two carbon atoms constituting the (6-6) bond of the $C_{60}$ molecule. This is because the two carbon atoms constituting the (6-6) bond have high electron-drawing property. It is considered that there are cases where the groups having a formula weight of 6 or more are bonded to one of the carbon atoms of the (6-6) bond or to both the carbon atoms, and examples of the case where the groups are bonded to both the carbon atoms include a case where the same groups are bonded to both the carbon atoms, a case where different groups are bonded thereto, and a case where the groups are bonded by cyclization addition to form a ring having the both carbon atoms contained as a part thereof. In the case of the cyclization addition, as a $C_{60}$ molecule is exemplified, the following cases can be exemplified.

The first case is that an oxygen atom is added to form a 3-membered ring by the oxygen atom and the two carbon atoms (following structural formula (1)).

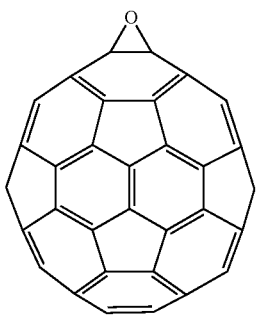

(1)

The next case is that a carbon atom having two phenyl groups (represented by Ph in the following structural formula (2)) bonded thereto is bonded to form a carbon 3-membered ring (following structural formula (2)).

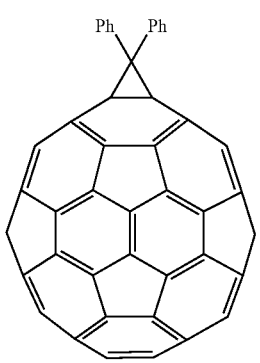

(2)

The further case is that a diene is bonded (the following structural formula (3)).

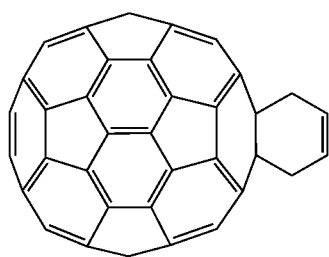

(3)

In the Embodiment 1, the fullerene derivative has a group having a formula weight of 6 or more. Fullerene hydride having a hydrogen atom having a formula weight of 1 bonded thereto is instable in a solvent to have such a problem that the addition thereof to a lithium secondary battery cannot be stably attained, and He having a formula weight of 4 has such a problem that it is difficult to be bonded to carbon constituting fullerene. On the other hand, it is considered that a sterically large group having a formula weight of 6 or more (such as Li having a formula weight of 7) strengthens the mutual interaction with lithium, which is the electromotive substance of a lithium secondary battery.

Figure 2:
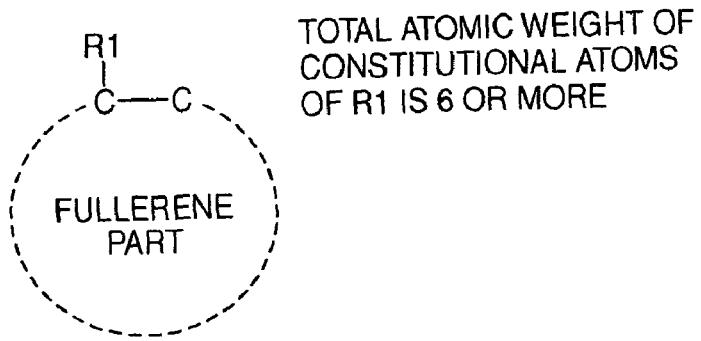
FIG. 2 is a diagram showing an example of fullerene having a group having a formula weight of 6 bonded thereto.
Figure 2:
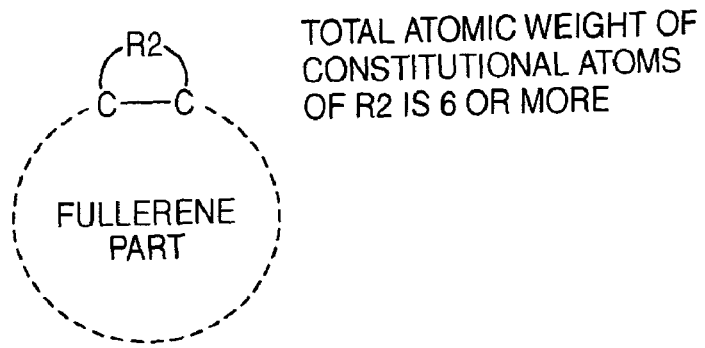

The state where the fullerene derivative has a group having a formula weight of 6 or more means that as shown in FIG. 2(a), a group represented by R1 is bonded to at least one carbon elements constituting fullerene, and a sole or plural atoms constituting R1 have a total atomic weight of 6 or more. In the case where a group having a formula weight of 6 or more is bonded to plural carbon atoms constituting fullerene, it is sufficient that the total atomic weight of the atoms constituting the group is 6 or more. For example, FIG. 2(b) shows an example where a group R2 having a formula weight of 6 or more is bonded to two carbon atoms constituting fullerene to form a cyclic structure (the group is added by cyclization addition), and in this case, a sole or plural atoms constituting R2 have a total atomic weight of 6 or more.

It is sufficient that the formula weight of the group having a formula weight of 6 or more is 6 or more, and a group having a formula weight of 16 or more is preferred. The upper limit of the formula weight is not particularly limited, and the group may have a large molecular weight such as a polymer. However, the formula weight is preferably 1,000 or less, more preferably 500 or less, further preferably 300 or less, and particularly preferably 200 or less, from the standpoint of steric hindrance.

The group having a formula weight of 6 or more is not particularly limited, it is preferably at least one selected from the group consisting of an alkali metal atom, a chalcogen atom, a halogen atom, an aliphatic hydrocarbon group, an aromatic hydrocarbon group, a heterocyclic group, a characteristic group containing oxygen, a characteristic group containing sulfur and a characteristic group containing nitrogen, since they are conveniently obtained industrially.

Examples of the alkali metal atom include lithium, sodium, potassium and rubidium, and lithium, sodium and potassium are preferred from the standpoint of easiness in industrial synthesis.

Examples of the chalcogen atom include oxygen, sulfur, selenium and tellurium, and oxygen and sulfur are preferred from the standpoint of easiness in industrial synthesis.

Examples of the halogen atom include fluorine, chlorine, bromine and iodine, and fluorine, chlorine and bromine are preferred from the standpoint of easiness in industrial synthesis. A group containing a halogen atom, such as an iodosyl group, may be used.

Examples of an aliphatic linear hydrocarbon group out of the aliphatic hydrocarbon group include a methyl group, an ethyl group, a propyl group, an isopropyl group, a butyl group, an isobutyl group, a sec-butyl group, a tert-butyl group, a pentyl group, an isopentyl group, a neopentyl group, a hexyl group, a heptyl group, an octyl group, a nonyl group, a decyl group, an undecyl group, a dodecyl group, a vinyl group, a 1-propenyl group, an allyl group, an isopropenyl group, a 1-butenyl group, a 2-butenyl group, a 2-pentenyl group and an ethynyl group. A methyl group, an ethyl group and a propyl group are preferred from the standpoint of easiness in industrial synthesis.

Examples of an alicyclic hydrocarbon group out of the aliphatic hydrocarbon group include a cyclopropyl group, a cyclopentyl group, a cyclohexyl group and 1-cyclohexenyl group. A cyclohexyl group is preferred from the standpoint of easiness in industrial synthesis.

Examples of the aromatic hydrocarbon group include a phenyl group, a tolyl group, a xylyl group, a mesityl group, a cumenyl group, a benzyl group, a diphenylmethyl group, a triphenylmethyl group, a stylyl group, a biphenylyl group and naphthyl group. A phenyl group, a benzyl group and a biphenylyl group are preferred from the standpoint of easiness in industrial synthesis.

Examples of the heterocyclic group include a furyl group, a furfuryl group, a thienyl group, a pyrrolyl group, a pyridyl group, a pyperidino group, a pyperidyl group and a quinolyl group, and a furyl group and a pyridyl group are preferred from the standpoint of easiness in industrial synthesis.

The characteristic group containing oxygen is not particularly limited as far as it contains oxygen, and examples thereof include a hydroxyl group, a hydrogen peroxide group, an oxygen atom (an epoxy group) and a carboxyl group, and a hydroxyl group and an oxygen are preferred from the standpoint of easiness in industrial synthesis.

The following groups are also exemplified as the characteristic group containing oxygen.

Examples of an alkoxy group include a methoxy group, an ethoxy group, a propoxy group, an isopropoxy group, a butoxy group and a phenoxy group, and a methoxy group and an ethoxy group are preferred from the standpoint of easiness in industrial synthesis.

Examples of a carboxylic acid group and an ester group include a carboxyl group, a methoxycarbonyl group, an ethoxycarbonyl group and an acetoxy group, and a carboxyl group and an acetoxy group are preferred from the standpoint of easiness in industrial synthesis.

Examples of an acyl group include a formyl group, an acetyl group, a propionyl group, a butylyl group, an isobutylyl group, a valeryl group, an isovaleryl group, a pivaloyl group, a hexanoyl group, an octanoyl group, a lauroyl group, a parmitoyl group, a stearoyl group, an oleoyl group, an acryloyl group, a methacryloyl group, a chloroformyl group, an oxal group, a cyclohexanecarbonyl group, a benzoyl group, a toluoyl group and a naphthoyl group, and a formyl group and an acetyl group are preferred from the standpoint of easiness in industrial synthesis.

Further examples of the characteristic group containing oxygen include an acetonyl group, a phenacyl group, a salicyl group, a salicyloyl group, an anisyl group and an anisoyl group. An acetonyl group and a salicyl group are preferred from the standpoint of easiness in industrial synthesis.

The characteristic group containing sulfur is not particularly limited as far as it contains sulfur, and examples thereof include a mercapto group, a thio group (—S—), a methylthio group, an ethylthio group, a phenylthio group, a thioformyl group, a thioacetyl group, a thiocarboxyl group, a dithiocarboxyl group, a thiocarbamoyl group, a sulfonic acid group, a mesyl group, a benzenesulfonyl group, a toluenesulfonyl group, a tosyl group and a sulfoamino group. A mercapto group and a sulfonic acid group are preferred from the standpoint of easiness in industrial synthesis.

The characteristic group containing nitrogen is not particularly limited as far as it contains nitrogen, and examples thereof include an amino group, a methylamino group, a dimethylamino group, an anilino group, a toluidino group, a xylydino group, a cyano group, an isocyano group, a cyanate group, an isocyanate group, a thiocyanate group, an isothiocyanate group, a hydroxyamino group, an acetylamino group, a benzamide group, a succinimide group, a carbamoyl group, a nitroso group, a nitro group, a hydrazino group, a phenylazo group, a naphthylazo group, an ureido group, an ureylene group, an amidino group and a guanidino group, and an amino group, a cyano group and a cyanate group are preferred from the standpoint of easiness in industrial synthesis.

The aforementioned groups having a formula weight of 6 or more may further be substituted by another group.

Among the aforementioned groups having a formula weight of 6 or more, particularly preferred examples thereof include sodium, potassium, oxygen, a hydroxyl group, an amino group, a sulfonic acid group, a methyl group, an ethyl group, a propyl group, a phenyl group, a biphenylyl group, an ethoxy group, fluorine, chlorine, bromine and iodine. Among the groups, oxygen has two bonds, and the two bonds are bonded to fullerene to form an epoxy group.

Particularly preferred examples of the fullerene derivative include fullerene oxide, fullerene hydroxide, fullerene halide (such as F, Cl, Br and I) and sulfonated fullerene, and fullerene oxide and fullerene hydroxide are most preferred from the standpoint of improvement of the battery characteristics.

The aforementioned groups having a formula weight of 6 or more may be bonded to at least one of the carbon atoms constituting fullerene. The number of the groups bonded to fullerene may be the maximum substitution amount of fullerene. The maximum substitution amount is, in the case where fluorine is used as the substituent, 48 for $C_{60}$ and 54 for $C_{70}$. In the case where the substitution amount is too large, there are some cases where the performance of the fullerene derivative, i.e., the improvement of the initial efficiency of the lithium secondary battery, is not sufficiently exerted, and thus the number of the groups bonded to fullerene is generally 36 or less, preferably 10 or less, and more preferably 4 or less. The number of the groups having a formula weight of 6 or more bonded to fullerene may be appropriately selected depending on the performance demanded for the lithium secondary battery.

The fullerene derivative can be synthesized from fullerene by the known process. For example, a desired fullerene derivative can be obtained by utilizing a reaction with a nucleophilic reagent (nucleophilic addition reaction), a cyclization addition reaction, a photo-addition (cyclization) reaction and an oxidation reaction.

The fullerene derivative having a group having a formula weight of 6 or more is generally in a powder form at an ordinary temperature (25° C.) and an ordinary humidity (50% RH), and the secondary particle diameter thereof is generally 10 nm or more, preferably 50 nm or more, and more preferably 100 nm or more, and is generally 1 mm or less, preferably 500 µm or less, and more preferably 100 µm or less.

(2) Carbonaceous Substance

Examples of the carbonaceous substance include a graphite material, such as graphite; carboniferous coke and petroleum coke; a carbide of carboniferous pitch or petroleum pitch, or a carbide of pitch having been subjected to an oxidation treatment; needle coke, pitch coke, and a carbide of a phenol resin or crystalline cellulose. Examples thereof also include a carbon material obtained by partially graphitizing the aforementioned carbonaceous substances, furnace black, acetylene black and pitch carbon fibers.

Among the carbonaceous substances, coke and a graphite material, such graphite, are preferred, and a graphite material, such as graphite, is particularly preferred owing to the large capacity thereof.

Examples of the graphite material include graphite powder, such as artificial graphite and natural graphite, and a purified product thereof, a graphitized product of electroconductive carbon black, such as acetylene black and Ketjen black, and carbon fibers, such as vapor phase growth carbon fibers. All the graphite materials may be used, and artificial graphite or natural graphite is preferred from the standpoint of capacity. Artificial graphite is particularly preferred since the battery performance can be easily controlled.

The graphite material may be subjected to an amorphous treatment on the surface thereof.

The carbonaceous substance is generally in a powder form at an ordinary temperature (25° C.) and an ordinary humidity (50% RH), and the average particle diameter thereof is generally 1 μm or more, and preferably 5 μm or more, and is generally 45 μm or less, preferably 35 μm or less, and more preferably 25 μm or less. In the case where the average particle diameter is too small, the specific surface area of the carbonaceous subsistence is increased, whereby the irreversible capacity is increased to lower the battery capacity. In the case where the average particle diameter is too large, on the other hand, the thickness of the active material layer is restricted, whereby it is difficult to form a uniform active material layer on the carbonaceous substrate.

The specific surface area of the carbonaceous substance is generally 0.1 $m^2$/g or more, preferably 0.3 $m^2$/g or more, and more preferably 0.5 $m^2$/g or more. In the case where the specific surface area is too small, the rate characteristics of the battery are deteriorated. The specific surface area of the carbonaceous substance is generally 30 $m^2$/g or less, preferably 20 $m^2$/g or less, and more preferably 10 $m^2$/g or less. In the case where the specific surface area is too large, the initial efficiency of the battery is lowered. The measurement of the specific surface area is attained by the BET method.

(3) Other Materials Contained in Anode Material for Lithium Secondary Battery

Examples of materials contained in the anode material for a lithium secondary battery of the Embodiment 1 include, in addition to the fullerene compound and the carbonaceous substance, a binder (described in detail later) used in an anode of a lithium secondary battery, and other additives, such as an electroconductive agent.

The species and the contents of the materials may be appropriately adjusted depending on the battery performance demanded.

(4) Relationship Between Surface of Carbonaceous Substance and Fullerene Compound In the anode for a lithium secondary battery of the Embodiment 1, the fullerene compound (the fullerene derivative having a group having a formula weight of 6 or more) is present on the surface of the carbonaceous substance.

In the Embodiment 1, the fullerene derivative having a group having a formula weight of 6 or more is present on the surface of the carbonaceous substance by attaching through van der Waals attraction. While the surface of the carbonaceous substance may be entirely covered with the fullerene compound, a part covered with the fullerene compound and a part not covered therewith may be present in combination on the surface of the carbonaceous substance. In the case where a part covered with the fullerene compound and a part not covered therewith may be present in combination on the surface of the carbonaceous substance, the initial efficiency of the lithium secondary battery can be further improved.

Descriptions for the fullerene derivative having a group having a formula weight of 6 or more and the carbonaceous substance are omitted herein since they have been made. The anode material for a lithium secondary battery of the Embodiment 1 has such an advantage that the fullerene compound may be only adsorbed on the surface of the carbonaceous substance to provide excellent productivity.

The amount of the fullerene compound present on the surface of the carbonaceous substance with respect to the weight of the carbonaceous substance is generally 0.001% by weight or more, preferably 0.005% by weight or more, and more preferably 0.01% by weight or more. In the case where the amount is too small, there are some cases where the effect of improving the battery capacity is insufficient. The amount of the fullerene compound is generally 10% by weight or less, preferably 1% by weight or less, more preferably 0.3% by weight or less, and most preferably 0.1% by weight or less. In the case where the amount is too large, there are some cases where the battery characteristics are insufficient.

The thickness of the fullerene derivative having a group having a formula weight of 6 or more present on the surface of the carbonaceous substance (in the case where the fullerene derivative is present as being sprinkled on the surface of the carbonaceous substance, the thickness at the part where the fullerene compound is present as being sprinkled) is generally 0.7 nm or more.

In the case where the thickness is 0.7 nm or more, a film having one molecule of more of the fullerene derivative can be formed. The thickness of the fullerene derivative is generally 1.5 μm or less, and preferably 0.05 μm or less. In the case where the thickness is too large, there are some cases where the resistance is increased upon using as an anode active material.

A process for producing the anode material for a lithium secondary battery according to the Embodiment 1 will be described later.

A-2. Embodiment 2, Embodiment 3 and Embodiment 4

In an anode material for a lithium secondary battery according to the Embodiment 2, a fullerene compound is present on the aforementioned carbonaceous substance, and spherical shell structures of the fullerene compound are crosslinked through at least one atom. In an anode material for a lithium secondary battery according to the Embodiment 3, a fullerene compound is present on the aforementioned carbonaceous substance, and a spherical shell structure of the fullerene compound is chemically bonded to the carbonaceous substance through at least one atom. In the Embodiment 4, the spherical shell structures of the fullerene compound are crosslinked through at least one atom, and the spherical shell structures of the fullerene compound are chemically bonded to the carbonaceous substance through at least one atom.

As the fullerene compound used in Embodiments 2, 3 and 4, the fullerene and the fullerene derivative described in the Embodiment 1 can be used. However, in the case where the fullerene derivative is used, the formula weight of the group bonded to the carbon atom of the spherical shell structure is not limited to 6 or more, but fullerene hydride may be used though it is difficult to use solely. It is preferred that fullerene hydride is crosslinked to each other through at least one atom to improve the stability of fullerene hydride.

The carbonaceous substance used in the Embodiments 2, 3 and 4 may be the same as the carbonaceous substance used in the Embodiment 1.

The Embodiments 2, 3 and 4 will be described, respectively, in detail below.

(1) Embodiment 2

The Embodiment 2 has such a state that the spherical shell structures of the fullerene compound are crosslinked through at least one atom to form a fullerene layer. In the Embodiment 2, not only the fullerene compound present on the surface of the carbonaceous substance are aggregated with each other through van der Waals attraction, but also the adjacent spherical shell structures of the fullerene compound are crosslinked through at least one atom, whereby the fullerene layer is improved in strength to provide such an advantage that the fullerene compound is suppressed from being eluted into the electrolyte solution and an organic solvent used upon producing the anode.

In the Embodiment 2, the carbonaceous substance has, on at least a part of the surface thereof, the fullerene layer containing the fullerene compound.

One of the characteristic features of the fullerene layer resides in that the spherical shell structures of the fullerene compound are crosslinked through at least one atom. The term crosslinking referred herein means such a state that the adjacent fullerene compound molecules are indirectly bonded to each other through a bonding group having at least one atom, and the fullerene compound may form a dimer or a polymer. The fullerene compound may also form a linear or network polymer.

In the case where the adjacent fullerene molecules have the crosslinked structure, the fullerene layer is improved in mechanical strength, and the fullerene compound is suppressed from being eluted to the electrolytic solution and an organic solvent used upon producing the anode, whereby such a fullerene layer can be obtained that has high stability in surface treatment effect.

The amount of the fullerene compound present in the fullerene layer is determined with respect to the surface area of the carbonaceous substance. Specifically, in the case where the carbonaceous substance is in a powder form, the amount of the fullerene compound is determined by the surface area measured by BET analysis in the nitrogen adsorption method. In the invention, the amount of the fullerene compound present in the fullerene layer is preferably 0.01 mg/m$^2$ or more, more preferably 0.1 mg/m$^2$ or more, and further preferably 0.2 mg/m$^2$ or more, per unit area of the carbonaceous substance. In the case where the amount of the fullerene present is too small, there are some cases where the effect of the surface treatment cannot be sufficiently obtained. The amount of the fullerene compound is generally 10 mg/m$^2$ or less, preferably 5 mg/m$^2$ or less, and more preferably 1 mg/m$^2$ or less. In the case where the amount of the fullerene present is too large, the proportion of the fullerene layer to the carbonaceous substance becomes too large, and thus there are some cases where the efficiency of the surface treatment is lowered.

In the case where the surface area of the carbonaceous substance is difficult to measure, the amount of the fullerene compound present may be determined in terms of the thickness of the fullerene layer. The thickness is generally 0.01 nm or more taking such cases into consideration that the surface of the carbonaceous substance is in an amorphous state or a crystalline state, and the thickness has a distribution. The thickness herein is an average thickness. As the size of one molecule of the fullerene compound is about 1 nm, a thickness less than the molecular size is determined herein, but there is no inconsistency since an area coverage of 1% means a thickness of 1/100 of the molecular thickness. The thickness is preferably 0.1 nm or more, and more preferably 1 nm or more.

The average thickness of the fullerene layer is generally 1 μm or less, preferably, 100 nm or less, more preferably 20 nm or less, particularly preferably 10 nm or less, and most preferably 5 nm or less. The sufficient effect of the surface treatment can be obtained with a thickness within the range.

Separate from the average thickness, the maximum thickness derived from nonuniformity on treatment is necessarily considered. In the case where a part of the fullerene layer having a particularly large thickness is present on the surface of the carbonaceous substance, not only the other parts are insufficiently treated, but also it is necessary to treat with an excessive amount of the fullerene compound. There is such a possibility that the part of the fullerene layer having a large thickness suffers decrease in permeability of lithium ions to cause increase in resistance. The maximum thickness is generally 5 times or less, preferably 2 times or less, more preferably 1.5 times or less, and further preferably 1.2 times or less, the average thickness.

In the case where the carbonaceous substance is in a powder form, the amount of the fullerene compound present may be determined in terms of the weight per the weight of the powder. This is because the definition in terms of percentage by weight is convenient upon managing the process. Specifically, the amount of the fullerene present is generally 0.001% by weight or more, preferably 0.005% by weight or more, and more preferably 0.01% by weight or more. The amount is generally 10% by weight or less, preferably 5% by weight or less, more preferably 3% by weight or less, further preferably 1% by weight or less, particularly preferably 0.3% by weight or less, and most preferably 0.1% by weight or less.

Examples of the fullerene compound include fullerene, the fullerene derivative and a mixture of fullerene and the fullerene derivative, as having been described.

The bonding group having at least one atom used upon crosslinking the spherical shell structures of the fullerene compound through at least one atom is not particularly limited as far as the group has divalent or higher valency, and specific examples thereof include an atom, such as oxygen, sulfur and selenium, a carbonyl group (—CO—), a carbonyloxy group (—COO—), an imino group (—NH—) and a carbonylimino group (—CO—NH—). These bonding groups may have another bonding group, such as a methylene group and an ethylene group, for extending the length of the bonding group.

Examples thereof also include a group obtained by removing two or more hydrogen atoms from a hydrocarbon group, for example, an aliphatic hydrocarbon group, such as a methylene group, an ethylene group, a propylene group, a trimethylene group, a butylene group, an isobutylene group and a neobutylene group, an aromatic hydrocarbon group, such as a phenylene group and a naphthylene group, and an alicyclic hydrocarbon group, such as a cyclohexylene group.

A bonding group, for example, an atom, such as oxygen, sulfur and selenium, a carbonyl group, a carbonyloxy group, an imino group and a carbonylimino group, may be introduced to the aforementioned hydrocarbon groups at the terminal part, to which the spherical shell structure of the fullerene compound is bonded, for adjusting the structure depending on purposes and for improving the reactivity. In the aforementioned bonding groups other than the aliphatic hydrocarbon groups, such a group as a methylene group and an ethylene group may be further introduced for extending the length of the bonding group.

Among the bonding groups, oxygen, sulfur, a carbonyl group and an imino group are preferred since they are industrially easily available and can produce the fullerene layer having a dense structure owing to their relatively simple and small structures. Oxygen is particularly preferred since crosslinking reaction can be effected through a simple reaction, such as an oxidation reaction.

Whether or not the spherical shell structures of the fullerene compound are bonded through at least one atom can be determined by using infrared spectrometric analysis.

The fullerene layer in the Embodiment 2 has such a structure that the adjacent spherical shell structures of the fullerene compound are crosslinked through at least one atom, as having been described, and in addition, such a site may be contained that the spherical shell structures are directly bonded through no bonding group. As an example of the case, the adjacent fullerene compounds are indirectly bonded through oxygen, and simultaneously they are directly bonded to each other, so as to form a furan structure or a thiolane structure.

A process for producing the anode material for a lithium secondary battery according to the Embodiment 2 will be described later.

(3) Embodiment 3

In the Embodiment 3, the spherical shell structure of the fullerene compound is chemically bonded to the carbonaceous substance through at least one atom to form a fullerene layer. In the Embodiment 3, not only the fullerene compound constituting the fullerene layer is adsorbed on the carbonaceous substance through van der Waals attraction, but also the spherical shell structure of the fullerene compound is chemically bonded to the carbonaceous substance through at least one atom to provide such an advantage that the fullerene compound is suppressed from being eluted into the electrolyte solution and an organic solvent used upon producing the anode.

In the Embodiment 3, the carbonaceous substance has, on at least a part of the surface thereof, the fullerene layer containing the fullerene compound.

In the Embodiment 3, the carbonaceous substance has on the surface thereof the fullerene layer containing the fullerene compound. In the Embodiment 3, the fullerene compound constituting the fullerene layer and the carbonaceous substance are chemically bonded to each other through at least one atom, and the carbonaceous substance preferably has, on the surface thereof, a reactive group, such as a hydroxyl group, a thiol group, and a group having an unsaturated double bond, e.g., a vinyl group and an allyl group.

While the spherical shell structure of the fullerene compound is chemically bonded to the carbonaceous substance through at least one atom in the fullerene layer, preferred ranges of the amount of the fullerene compound present in the fullerene layer herein are the same as those in the Embodiment 2, and descriptions thereof is omitted. As the fullerene compound and the bonding group for chemically bonding the spherical shell structure of the fullerene compound to the carbonaceous substance through at least one atom used in the Embodiment 3, those described for the Embodiment 2 can be exemplified.

However, the bonding group is preferably such a group exerting high reactivity with the group bonded to the carbonaceous substance from the standpoint of reactivity with the carbonaceous substance. For example, in the case where a hydroxyl group is bonded to the carbonaceous substance, the bonding group contained in the fullerene compound is preferably a hydroxyl group, a carboxyl group and an isocyanate group. The aforementioned combinations improve the reaction efficiency.

Whether or not the spherical shell structure of the fullerene compound is chemically bonded to the carbonaceous substance through at least one atom can be determined in the following manner. For example, in the case where a polar group is bonded to the surface of the carbonaceous substance, and the spherical shell structure of the fullerene compound is bonded to the carbonaceous substance through the bonding group, the change of the amount of the polar group on the surface of the carbonaceous substance before and after bonding the spherical shell structure is determined, by the X-ray photoelectron spectroscopy and so on. In the case where a small amount of the fullerene compound is dispersed on the surface of the carbonaceous substance (for example, dispersed in a monomolecular level), it can be considered that the spherical shell structures of the fullerene compound are crosslinked to the surface of the carbonaceous substance if the elution amount is small upon carrying out the elution test described later.

A process for producing the anode material for a lithium secondary battery according to the Embodiment 3 will be described later.

(3) Embodiment 4

In the Embodiment 4, the spherical shell structures of the fullerene compound are crosslinked through at least one atom, and simultaneously, the spherical shell structures of the fullerene compound are chemically bonded to the carbonaceous substance through at least one atom.

Accordingly, the anode material for a lithium secondary battery of the Embodiment 4 is a layered structure having a carbonaceous substance and a fullerene layer containing a fullerene compound formed on the surface of the carbonaceous substance, and one of the characteristic features thereof is that it has both the structure where the spherical shell structures of the fullerene compound are crosslinked through at least one atom (Embodiment 2) and the structure where the spherical shell structures of the fullerene compound are chemically bonded to the carbonaceous substance through at least one atom (Embodiment 3).

In this case, the structure having the spherical shell structures of the fullerene compound crosslinked and the structure having the spherical shell structures chemically bonded to the carbonaceous substance may be catenated to or separated from each other.

In the Embodiment 4, the fullerene compound constituting the fullerene layer is crosslinked to each other or is chemically bonded to the carbonaceous substance, whereby the fullerene compound can be suppressed from being eluted into the electrolyte solution and an organic solvent used upon producing the anode.

The Embodiment 4 uses the Embodiment 2 and the Embodiment 3 in combination, and the fullerene layer used is as those described for the Embodiment 2 and the Embodiment 3. However, as the bonding group having at least one atom, it is preferred that one kind thereof having high reactivity to both the spherical shell structure of the fullerene compound and the carbonaceous substance is used, or two or more kinds thereof having high reactivity to them, respectively, are used in combination. Preferred examples of the bonding group having high reactivity to both of them include an oxygen atom.

A-3. Embodiment 5

In the Embodiment 5, the fullerene derivative having a group having a formula weight of 6 or more is present on the surface of the carbonaceous substance, and simultaneously, the spherical shell structures of the fullerene compound are bonded through at least one atom, and the spherical shell structure of the fullerene compound is chemically bonded to the carbonaceous substance. In other words, the Embodiment 5 is such an embodiment that appropriately uses the Embodiment 1, the Embodiment 2 and the Embodiment 3 in combination.

In the fullerene compound present on the surface of the carbonaceous substance in the Embodiment 5, the prescribed fullerene derivative may be present as single bodies (in a monomolecular state or a state where plural molecules are aggregated), the fullerene derivative may be bonded to another fullerene compound (which may be fullerene or the same or different fullerene compound) through at least one atom, or the fullerene derivative may be bonded to the carbonaceous substance through at least one atom.

As the carbonaceous substance and the fullerene compound used in the Embodiment 5, the same ones as in the Embodiment 1 can be preferably used. As the fullerene layer, the same ones as in the Embodiment 2 and the Embodiment 3 can be preferably used.

A-4. Elution Amount of Fullerene Compound

The anode material for a lithium secondary battery of the invention can be effectively suppressed in elution amount of the fullerene compound into an organic solvent, particularly by employing the constitutions shown in the Embodiments 2 to 5. In order to enable applications to lithium secondary batteries for various purposes, it is preferred that the elution amount of the fullerene compound per unit weight of the cathode material for a lithium secondary battery of the invention having the fullerene compound present on the surface of the carbonaceous substance is 2 mg/g or less.

For example, in the Embodiments 2 to 5, the fullerene compound is crosslinked and/or is chemically bonded to the surface of the carbonaceous substance to improve the solvent resistance and the mechanical characteristics thereby. In the case of immersing in a solvent, it is preferred that the crosslinked fullerene compound present on the surface and/or the fullerene compound chemically bonded to the surface of the carbonaceous substance are completely not eluted. In actual cases, however, there are some cases where a part of the fullerene compound thus treated is eluted to an organic solvent because there are such site that are insufficient in crosslinking or chemical bonding, and a mild crosslinking condition is necessarily employed depending on the species of the carbonaceous substance, and the elution amount in this case is preferably 2 mg/g or less per unit weight of the anode material for a lithium secondary battery. The elution amount per unit weight is such a value that varies depending on the treated amount and the specific surface area of the carbonaceous substance. Upon considering the practical use conditions of the lithium secondary battery, (1) the composition thereof is generally determined on weight basis, and (2) the eluted components not only fail to exert the primary effect, but also cause a possibility of impairing the performance by attaching to the other components. Therefore, the elution amount per unit weight is preferably a certain amount or less for stable applications of the carbonaceous substance thus treated. The elution amount is more preferably 1.5 mg/g or less, further preferably 1.3 mg/g or less, particularly preferably 1.0 mg/g or less, and most preferably 0.5 mg/g or less.

On the other hand, it is also important to comprehend the amount of the fullerene compound remaining as being present on the carbonaceous substance after the test. Specifically, the amount of the fullerene compound remaining as being present on the carbonaceous substance is preferably determined with respect to the surface area of the carbonaceous substance from the standpoint of effectiveness of the treatment. This is because from the standpoint of the treatment effected by covering the surface, a preferred treated state with the fullerene compound can be determined by estimating the amount per unit area.

Specifically, in the case where the carbonaceous substance is in a particle form (powder), the amount of the fullerene compound remaining on the surface of the carbonaceous substance after carrying out the test is 0.01 mg/m$^2$ or more, preferably 0.1 mg/m$^2$ or more, and more preferably 0.2 mg/m$^2$ or more, with respect to the surface area measured BET analysis in the nitrogen adsorption method. In the case where the amount is too small, the effect of the surface treatment becomes insufficient.

The test method for examining the elution amount in the invention is as follows.

[Test Method]

(1) 0.1 g of the anode material for a lithium secondary battery is dissolved in 2 mL of a trimethylbenzene (which is sometimes referred to as TMB in this specification) solvent or an N-methylpyrrolidone (which is sometimes referred to as NMP in this specification) solvent to prepare a sample solution.

(2) The sample solution is allowed to stand at an ordinary temperature (25±5° C.) and an ordinary humidity (50±15% RH) for 24 hours.

(3) A supernatant fluid of the sample solution thus allowed to stand is recovered, and a content of the fullerene compound contained in the supernatant fluid is measured.

(4) The measured value is converted to a total elution amount of the sample solution, and the converted value is divided by 0.1 g.

The measuring method of the content of the fullerene compound in the item (3) of the aforementioned test method is not particularly limited, and for example, it can be measured by evaporating the solvent of the supernatant fluid by drying and measuring the weight of the residue.

In the case where the content of the fullerene compound in the fullerene layer is previously known, the elution ratio (%) of the fullerene compound to the solvent can be calculated in such a manner that in the item (3) of the test method, the total elution amount in 2 mL of the trimethylbenzene solvent or an N-methylpyrrolidone solvent is calculated and then divided by the content of the fullerene compound. The elution ratio is preferably 80% or less, more preferably 50% or less, more preferably 40% or less, and particularly preferably 25% or less.

Other specific examples of the method for measuring the content of the fullerene compound contained in the supernatant fluid in the item (3) of the test method include a method by ultraviolet-visible absorption analysis. As a specific method of the ultraviolet-visible absorption analysis, for example, the supernatant fluid obtained in the item (3) of the test method is collected and the concentration of the eluted component is quantitatively determined by ultraviolet-visible absorption analysis. The concentration can be determined by previously preparing a calibration curve. The method by absorption analysis also has such an advantage that the change in molecular structure can be comprehended by the shape of the spectrum. For example, in the case where the concentration of the supernatant fluid is determined as 0.5 mg/mL, it can be determined that 1 mg of the component is eluted from the powder since the amount of the solvent is 2 mL, and the elution amount can be calculated as 10 mg/g since the weight of the cathode material for a lithium secondary battery is 0.1 g.

In this method, it is preferred that the amounts of anode material for a lithium secondary battery and the solvent are determined in such a manner that the measurement can be easily carried out depending on the method of detection. The elution amount is finally calculated as an elution weight per unit weight of the anode material for a lithium secondary battery, and therefore, there is no large influence on the measurement effect if the amounts of the anode material for a lithium secondary battery and the solvent are changed. However, it is preferred that the amount of the solvent is as large as it can sufficiently dissolve the expected elution amount.

TMB or NMP is preferred as the solvent, other solvents may be used depending on necessity of the quantitative determination method. In this case, compensation is carried out taking the difference in solubility in TMB or NMP into consideration, whereby the effect of the invention can be ensured.

It is possible that solvents may be selected depending on the species of the fullerene compound used. For example, TMB is used in the case where the fullerene compound before crosslinking or chemically bonding is an unmodified fullerene (such as $C_{60}$ and $C_{70}$), a fullerene derivative having an alkyl group or a fullerene derivative having an aromatic group. NMP can dissolve $C_{60}$ and $C_{70}$ while it is a polar solvent, and thus NMP can be used as the solvent in the case where $C_{60}$ or $C_{70}$ is used as the fullerene compound before crosslinking or chemically bonding. NMP is preferably used in the case of a fullerene compound having a polar group.

B. Process for Producing Anode Material for Lithium Secondary Battery

The process for producing the anode material for a lithium secondary battery used in the invention is not particularly limited as far as the aforementioned embodiments can be attained.

As an example of the process for producing the anode material for a lithium secondary battery used in the invention, a process for producing an anode material for a lithium secondary battery having a fullerene compound is present in a monomolecular form or an aggregated form of molecules on a surface of a carbonaceous substance as in the Embodiment 1 (hereinafter, the production process is sometimes referred to as "Production Process 1") will be described below.

Subsequently, a process for producing an anode material for a lithium secondary battery according to the Embodiments 2 to 4 (hereinafter, the production process is sometimes referred to as "Production Process 2") will be described. The Production Process 2 relates to a process for producing an anode material for a lithium secondary battery having a fullerene compound with spherical shell structures thereof crosslinked with each other through at least one atom, a process for producing an anode material for a lithium secondary battery having a fullerene compound with a spherical shell structure thereof chemically bonded to a surface of a carbonaceous substance through at least one atom, or a process for producing an anode material for a lithium secondary battery having a fullerene compound with spherical shell structures thereof crosslinked with each other through at least one atom and the spherical shell structures of the fullerene compound being chemically bonded to a surface of a carbonaceous substance through at least one atom.

The anode material for a lithium secondary battery of the Embodiment 5 is a combination of the Embodiments 1, 2 and 3, and therefore, the production process thereof may be obtained by appropriately combining the following Production Process 1 and Production Process 2. For example, the Production Process 2 is carried out, and the Production Process 1 is carried out.

B-1. Production Process 1

In the Production Process 1, the fullerene derivative having a group having a formula weight of 6 or more (the fullerene derivative is simply referred to as a "fullerene compound" in this item "B-1") is made present on the surface of the carbonaceous substance.

Examples of the method for making the fullerene compound present on the surface of the carbonaceous substance include such various methods as a gas phase process, in which the fullerene compound in a gas state is made present on the carbonaceous substance, a liquid phase process, in which the fullerene compound and the carbonaceous substance are dissolved or dispersed in a solvent to make present on the surface of the carbonaceous substance, and a solid phase process, in which the fullerene compound in a sold state is made in contact with the carbonaceous substance in a solid state to effect surface modification. Among these methods, the most convenient method is the liquid phase process.

(Liquid Phase Process)

Specific examples of the liquid phase process include such a method that a solution having the fullerene compound dissolved therein is mixed with the carbonaceous substance, and after stirring for a prescribed period of time, the solution is removed by decantation, followed by drying, to obtain processed powder. In this method, there is such a strong tendency that the surface modification is attained by adsorption effect of the fullerene compound to the carbonaceous substance, and the modification amount is limited to a significantly small amount. While the method is convenient, the surface modification amount of the carbonaceous substance with the fullerene compound is difficult to comprehend due to the unreacted fullerene compound remaining in the solvent removed by decantation.

Other specific examples of the liquid phase process include such a method that a solution having the fullerene compound dissolved therein is put into the carbonaceous substance in an amount providing a desired surface treatment rate, and after stirring, the solvent is removed by evaporation to obtain processed powder. In this method, the fullerene compound thus put is entirely used for the surface modification to provide such an advantage that the modification amount can be easily controlled.

After the liquid phase reaction, the solvent is removed by spontaneously drying or drying by heating to a prescribed temperature to obtain an anode material for a lithium secondary battery having a carbonaceous substance having present on the surface thereof the fullerene compound.

(Solid Phase Reaction)

Specific examples of the solid phase process for the case where the carbonaceous substance is in a powder form include such a method that the carbonaceous substance is mixed with the fullerene compound in a fine particle form and stirring and shearing at high speed to make the fullerene compound present on the surface of the carbonaceous substance. The method can be classified depending on the stirring method into the jet-mill method, in which the particles are made collide with each other in airflow, and a planetary stirring method, in which powder having a relatively high density is strongly stirred with blades.

(Gas Phase Reaction)

Specific examples of the gas phase process for the case where the carbonaceous substance is in a powder form include the so-called vacuum deposition method, in which the fullerene compound is sublimated by heating preferably in vacuum and accumulated on the surface of the carbonaceous substance disposed as opposite thereto.

B-2. Production Process 2

In the Production Process 2, for example, after making the fullerene compound present on the surface of the carbonaceous substance, the fullerene layer may be formed by crosslinking or chemically bonding, and a part or the whole of the fullerene compound may be previously crosslinked and then made present on the surface of the carbonaceous substance. The anode material is preferably produced by the following process.

The process for producing an anode material for a lithium secondary battery according to the Production Process 2 is a process for producing an anode material for a lithium secondary battery, the anode material having a carbonaceous substance having on a surface thereof a fullerene layer containing a fullerene compound, characterized by having:

- a fullerene compound supporting step of making the fullerene compound present on the surface of the carbonaceous substance; and
- at least one step of: a crosslinking step of crosslinking spherical shell structures of the fullerene compound through at least one atom; and a chemically bonding step of chemically bonding a spherical shell structure of the fullerene compound to the surface of the carbonaceous substance through at least one atom. The steps will be described in detail below.

(1) Fullerene Compound Supporting Step

In the fullerene compound supporting step, the fullerene compound is made present on the surface of the carbonaceous substance. As the carbonaceous substance and the fullerene compound, those that are the same as in the aforementioned anode material for a lithium secondary battery can be used.

The method for making the fullerene compound on the surface of the carbonaceous substance is not particularly limited as far as the fullerene compound can be present uniformly on the surface of the carbonaceous substance. Examples thereof include a gas phase process, in which the fullerene compound in a gas state is made present on the carbonaceous substance, a liquid phase process, in which the fullerene compound and the carbonaceous substance are dissolved or dispersed in a solvent to make present on the surface of the carbonaceous substance, and a solid phase process, in which the fullerene compound in a sold state is made in contact with the carbonaceous substance in a solid state to effect surface modification. Among these methods, the most convenient method is the liquid phase process.

(Liquid Phase Process)

Specific examples of the liquid phase process for the case where the carbonaceous substance is in a powder form include such a method that a solution having the fullerene compound dissolved therein or a dispersion liquid having the fullerene compound dispersed therein is mixed with the p carbonaceous substance, and after stirring for a prescribed period of time, the solution is removed by decantation, followed by drying, to obtain a processed carbonaceous substance (processed powder). In this method, the fullerene compound adsorbed to the surface of the carbonaceous substance is basically molecules treating the surface of the carbonaceous substance while depending on the extent of the removal of the solution by decantation. A monomolecular adsorption layer can be relatively easily formed by adsorption of the molecules from the solution, and the surface nature can be significantly effectively modified even with an extremely small amount of the fullerene present on the surface of the carbonaceous substance.

Other specific examples of the liquid phase process for the case where the carbonaceous substance is in a powder form include such a method that a solution having the fullerene compound dissolved therein or a dispersion liquid having the fullerene compound dispersed therein is put into the carbonaceous substance in an amount providing a desired surface treatment rate, and after stirring, the solvent is removed by evaporation to obtain a processed carbonaceous substance (processed powder). In this method, the fullerene compound thus put is entirely used for the surface treatment of the carbonaceous substance to provide such an advantage that the amount of the fullerene compound present on the surface of the carbonaceous substance can be easily controlled. It is also convenient from the standpoint of process since the powder to be treated and the solution of the fullerene compound are simply put in a vessel, followed by drying as they are. In this method, it is preferred that the system is adjusted under consideration of the species of the solvent, the drying conditions, the concentration of the fullerene compound, the total amount of the fullerene compound with respect to the carbonaceous substance, and the like. This is because there are cases where the fullerene compound is separately precipitated, and after the treatment, an excessive fullerene compound is deposited in a large amount on the surface of the carbonaceous substance.

Specific examples of the liquid phase process for the case where the carbonaceous substance is in a powder form also include the so-called spray drying method, in which the carbonaceous substance in a powder form is mixed by spraying in a solution having the fullerene compound dissolved therein or a dispersion liquid having the fullerene compound dispersed therein, followed by drying. This method can reduce the necessary amount of the solvent and can be carried out as a continuous process, and thus it is excellent in productivity.

(Solid Phase Process)

Specific examples of the solid phase process for the case where the carbonaceous substance is in a powder form include such a method that the carbonaceous substance is mixed with the fullerene compound in a fine particle form and stirring and shearing at high speed to make the fullerene compound present on the surface of the carbonaceous substance. The method can be classified depending on the stirring method into the jet-mill method, in which the particles are made collide with each other in airflow, and a planetary stirring method, in which powder having a relatively high density is strongly stirred with blades.

(Gas Phase Process)

Specific examples of the gas phase process for the case where the carbonaceous substance is in a powder form include the so-called vacuum deposition method, in which the fullerene compound is sublimated by heating preferably in vacuum and accumulated on the surface of the carbonaceous substance disposed as opposite thereto.

(2) Crosslinking Step or Chemically Bonding Step

The Production Process 2 has at least one of the crosslinking step and the chemically bonding step. These steps may be carried out sequentially, or these steps may be carried out simultaneously. In the case where they are carried out sequentially, the order thereof is not particularly limited. In the case where they are carried out simultaneously, for example, it is possible that these steps are carried out simultaneously under the same heating treatment conditions. The respective steps will be described below.

(Crosslinking Step)

In the crosslinking step, the spherical shell structures of the fullerene compound present on the surface of the carbonaceous substance are crosslinked through at least one atom.

In the case where the fullerene compound made present in the aforementioned fullerene compound supporting step does not have a crosslinking functional group, the fullerene compound can be crosslinked by making in contact with a compound having a crosslinking functional group (hereinafter, referred to as an addition reaction).

Examples of the compound for effecting the addition reaction include a compound having oxygen, sulfur and at least two crosslinking functional groups. From the standpoint of reactivity, a compound having oxygen, sulfur and at least two crosslinking functional groups at the ends thereof is preferred.

Examples of the crosslinking functional group include a mercapto group, an amino group, a carboxyl group, an isocyanate group, an epoxy group, a vinyl group and an acrylic group. These functional groups may be used solely or in combination of two or more kinds of them.

The compound having at least two crosslinking functional groups preferably has a low molecular weight for improving the surface treating effect of the fullerene compound, and specifically, the molecular weight thereof is preferably 40 or more, and particularly preferably 50 or more, and is preferably 200 or less, and particularly preferably 100 or less. In the case where the molecular weight is in the range, the distance between the fullerene compounds or the distance between the fullerene compound and the substrate bonded thereto is shortened to make a fullerene layer having a dense structure.

Specific examples of the method for crosslinking by the addition reaction include such a method that a divalent amine, such as diaminopropylene, is made in contact with fullerene in a gas phase to effect crosslinking through chemical reaction between the amine and fullerene. Other examples thereof include such a method that oxygen is added to fullerene by heat oxidation, contact with ozone or treatment with an oxidative substance, so as to effect crosslinking by an ether bond.

Among these, the method of crosslinking the spherical shell structures of the fullerene compound through an ether bond containing an oxygen atom is preferred since industrial production can be easily made.

In the case where the fullerene compound originally has a crosslinking functional group, on the other hand, it can be crosslinked through the bonding reaction of the groups. The reaction by contacting a compound having a crosslinking functional group may further be used in combination.

Examples of the crosslinking functional group contained in the fullerene compound include a sulfur atom, an oxygen atom, a hydroxyl group, a mercapto group, an amino group, a carboxyl group, an isocyanate group, a vinyl group and an acrylic group.

Specific examples of the method for crosslinking by the bonding reaction include such a method that the fullerene compound having a hydroxyl group is crosslinked by a condensation reaction, and in this method, a dehydration reaction of the hydroxyl groups of the fullerene compounds adjacent to each other is effected to crosslink them through an ether bond. The fullerene compound having a hydroxyl group is preferably a fullerenol compound obtained by bonding a hydroxyl group directly to $C_{60}$ or $C_{70}$.

The number of the hydroxyl groups in one molecule of the fullerene compound is generally 2 or more, preferably 4 or more, and more preferably 6 or more. In the case where the number of the hydroxyl groups is too small, the number of the crosslinking bonds is small, whereby there are some cases where the sufficient elution suppression effect of the fullerene compound cannot be obtained. The number of the hydroxyl groups is generally 70 or less, preferably 36 or less, and more preferably 20 or less. In the case where the number of the hydroxyl groups is too large, the spherical shell structure of the fullerene compound is instabilized, and the electron state is changed, whereby there are some cases where the surface treatment effect of the fullerene compound is lost depending on purposes. A large number of sites, to which hydroxyl groups are introduced, are present in the fullerene compound, and the hydroxyl groups may be randomly bonded to the carbon atoms constituting the spherical shell structure of the fullerene compound. It is preferred that the hydroxyl groups are uniformly present.

There are cases where the number of hydroxyl groups introduced is different depending on the fullerene compound, but such a state causes no problem. It is preferred that the number of introduction is distributed in a narrow range with the average value as the center.

The crosslinking step can be effected by a heat treatment (which includes thermal oxidation in some cases) an ultraviolet ray irradiation treatment, an electron beam irradiation treatment and the like, and the heat treatment is preferred owing to the simpleness thereof.

The heating temperature is generally 60° C. or more, preferably 100° C. or more, more preferably 120° C. or more, and most preferably 200° C. or more, while it depends on the treating conditions. In the case where thermal oxidation is effected, the temperature is generally 0° C. or more, preferably 100° C. or more, more preferably 250° C. or more, and most preferably 300° C. or more. This is because there are some cases where the crosslinking cannot be sufficiently effected when the temperature is too low. The temperature is generally 1,500° C. or less, preferably 1,000° C. or less, more preferably 500° C. or less, and most preferably 400° C. or less. In the case where the temperature is too high, there are some cases where the spherical shell structure of the fullerene compound is broken, and the fullerene compound is burnt out when thermal oxidation is effected.

The period of time for heating is generally 1 minute or more, preferably 10 minutes or more, more preferably 30 minutes or more, and most preferably 1 hour or more, while it varies depending on the treating conditions. This is because there are some cases where the crosslinking cannot be sufficiently effected when the period is too short. The period of time is generally 24 hours or less, preferably 12 hours or less, more preferably 6 hours or less, and most preferably 4 hours or less. In the case where the period is too long, there are some cases where the spherical shell structure of the fullerene compound is broken, and the fullerene compound is burnt out when thermal oxidation is effected, whereby the production efficiency is deteriorated.

The atmosphere thereon is preferably an inert atmosphere. Examples of the inert atmosphere include nitrogen, a rare gas and vacuum, and preferably nitrogen and vacuum. In the case where thermal oxidation is effected, air or oxygen is used. The pressure is generally $10^{-5}$ atm or more, while it varies depending on the treating conditions. The pressure is preferably as low as possible when a vacuum atmosphere is used, and under consideration of productivity, such a range that can be depressurized by an ordinary oil rotary pump or aspirator is practically used. The pressure is generally 10 atm or less, preferably 1.1 atm or less, and more preferably 1 atm or less. This is because there are some cases where removal of water thus dehydrated is delayed or becomes insufficient when the pressure is too high.

The oxygen pressure upon effecting thermal oxidation is generally $10^{-5}$ atm or more, preferably $10^{-3}$ atm or more, more preferably 0.1 atm or more, and most preferably the atmospheric pressure, while it varies depending on the treating conditions. This is because in the case where the oxygen pressure is too low, there are some cases where oxidation cannot proceed sufficiently, whereby the fullerene compound is not crosslinked, or the crosslinking rate is lowered to deteriorate the productivity. The pressure is generally 10 atm or less, preferably 1 atm or less, more preferably 0.3 atm or less, and most preferably the oxygen partial pressure in the air (about 0.2 atm). This is because it is necessary to consider the explosion safety and the production equipments in the case where the oxygen pressure is too high.

(Chemically Bonding Step)

In the chemically bonding step, the spherical shell structure of the fullerene compound present on the surface of the carbonaceous substance is chemically bonded to the carbonaceous substance through at least one atom.

As the method for chemically bonding, the same procedures as described for the crosslinking step can be used.

Specifically, in the case where the fullerene compound present in the fullerene compound supporting step or the carbonaceous substance does not originally have a chemically bonding functional group, the chemical bonding can be effected by making the fullerene compound or the carbonaceous substance into contact with a compound having a chemically bonding functional group.

In the case where the fullerene compound or the carbonaceous substance originally has a chemically bonding functional group, the chemical bonding can be effected by bonding reaction of these groups or by an addition reaction in combination.

The compound for making in contact therewith for effecting the addition reaction is not particularly limited as far as it is a compound having at least two chemically bonding functional groups. Examples of the chemically bonding functional group include a mercapto group, an amino group, a carboxyl group and an isocyanate group. These functional groups may be used solely or in combination of two or more kinds of them.

The compound having the functional group preferably has a low molecular weight for improving the surface treating effect of the fullerene compound, and specifically, the molecular weight thereof is preferably 40 or more, and particularly preferably 50 or more, and is preferably 200 or less, and particularly preferably 100 or less. In the case where the molecular weight is in the range, the distance between the fullerene compounds or the distance between the fullerene compound and the substrate bonded thereto is shortened to make a fullerene layer having a dense structure.

Such a method also can be exemplified that oxygen is added to the fullerene compound or the carbonaceous substance by effecting thermal oxidation, contact with ozone or treatment with an oxidative substance to make chemical bonding through an ether bond, and among these, thermal oxidation is preferably used.

Examples of the method for chemically bonding through bonding reaction include such a method that condensation reaction (dehydration reaction) of the fullerene compound and the carbonaceous substance having a hydroxyl group is effected to make chemical bonding through an ether bond. Preferred examples of the fullerene compound having a hydroxyl group is the same as those described in the crosslinking reaction.

The chemically bonding step can be effected by a heat treatment (which includes thermal oxidation in some cases), an ultraviolet ray irradiation treatment, an electron beam irradiation treatment and the like, and the heat treatment is preferred owing to the simpleness thereof. The preferred treating conditions are the same as those described for the crosslinking step.

C. Anode for Lithium Secondary Battery and Lithium Secondary Battery

A carbonaceous substance is generally used as an anode active material, which absorbs and releases lithium. In the invention, the anode material for a lithium secondary battery containing a carbonaceous substance having present on the surface thereof the fullerene compound is used, and the fullerene compound and the carbonaceous substance are mutually reacted, whereby the absorbing and releasing amounts of lithium on the surface of the carbonaceous substance as an anode active material are changed to improve the capacity of the battery and the initial efficiency of the battery.

The anode for a lithium secondary battery containing the anode material for a lithium secondary battery of the invention and the lithium secondary battery using the anode will be described below.

In the invention, the anode for a lithium secondary battery containing a carbonaceous substance having present on the surface thereof the fullerene compound is used for producing an anode for a lithium secondary battery.

The lithium secondary battery herein generally has an ordinary form, i.e., battery elements including a cathode and an electrolyte, as well as the anode, are housed in a housing.

The anode generally contains an active material layer formed of the anode material, formed on a current collector. That is, the active material layer contains at least an anode active material containing a carbonaceous substance having present on the surface thereof the fullerene compound, and in general, it has a binder and, depending on necessity, an additive, such as an electroconductive agent, in addition to the materials.

The proportion of the anode active material in the active material layer is generally 10% by weight or more, more preferably 30% by weight or more, and more preferably 50% by weight or more, and is generally 99% by weight or less, and preferably 98% by weight or less. In the case where the amount of the active material is too large, there is such a tendency that the mechanical strength of the electrode is deteriorated, and in the case where it is too small, there is such a tendency that the battery performance, such as the capacity, is deteriorated.

It is necessary that the binder used in the active material layer is stable to the electrolyte solution and the like, and various materials are used from the standpoint of weather resistance, chemical resistance, heat resistance, flame resistance and the like. Specific examples thereof include an inorganic compound, such as silicate and glass; an alkane polymer, such as polyethylene, polypropylene and poly-1,1-dimethylethylene; an unsaturated polymer, such as polybutadiene and polyisoprene; a polymer having a cyclic structure in the polymer chain, such as polystyrene, polymethylstyrene, polyvinylpyridine and poly-N-vinylpyrrolidone; and a cellulose compound, such as methyl cellulose and carboxymethyl cellulose.

Other specific examples thereof include an acrylic derivative polymer, such as polymethyl methacrylate, polyethyl methacrylate, polybutyl methacrylate, polymethyl acrylate, polyethyl acrylate, polyacrylic acid, polymethacrylic acid and polyacrylamide; a fluorine resin, such as polyvinyl fluoride, polyvinylidene fluoride and polytetrafluoroethylene; a CN group-containing polymer, such as polyacrylonitrile and polyvinyldene cyanide; a polyvinyl alcohol polymer, such as polyvinyl acetate and polyvinyl alcohol; a halogen-containing polymer, such as polyvinyl chloride and polyvinylidene chloride; and an electroconductive polymer, such as polyaniline.

A mixture, a modified product, a derivative, a random copolymer, an alternating copolymer, a graft copolymer and a block copolymer of the aforementioned polymers may be used. The weight average molecular weight of the resin is generally from 10,000 to 3,000,000, and preferably about from 100,000 to 1,000,000. In the case where the weight average molecular weight is too small, there is such a tendency that the strength of the coated film is lowered. In the case where it is too large, on the other hand, there are such cases that the paint for forming a cathode is increased in viscosity to make the formation of the electrode difficult. Preferred examples of the binder resin include a fluorine resin and a CN group-containing polymer, and more preferably polyvinylidene fluoride.

The using amount of the binder is generally 0.1 part by weight or more, and preferably 1 part by weight or more, and is generally 30 parts by weight or less, preferably 20 parts by weight or less, and more preferably 10 parts by weight or less, per 100 parts by weight of the anode active material. In the case where the amount of the binder is too small, there is such a tendency that the strength of the active material layer is lowered, and in the case where the amount of the binder is too large, there is such a tendency that the capacity of the battery is lowered.

The active material layer may contain, depending on necessity, an electroconductive material, an additive exerting various functions, such as a reinforcing material, powder and a filler.

As the current collector used as the anode, various materials that cause no electrochemical problem, such as elution, and can function as a current collector of a battery can be used, and in general, a metal and an alloy, such as copper, nickel and stainless steel, are used. Copper is preferably used. Examples of the shape of the current collector include a plate form and a mesh form. The thickness of the current collector is generally 0.1 μm or more, and preferably 1 μm or more, and is generally 100 μm or less, preferably 30 μm or less, and more preferably 20 μm or less. In the case where it is too thin, there is such a tendency that the mechanical strength is lowered to cause a problem on production. In the case where it is too thick, the overall capacity of the battery is lowered. In order to reduce the weight of the secondary battery, i.e., in order to improve the weight energy density, a perforated carbonaceous substance, such as an expanded metal and a punching metal, may be used. In this case, the weight can be freely changed by changing the aperture ratio. In the case where contact layers are formed on both surfaces of the perforated carbonaceous substance, there is such a tendency that the coated films are further suppressed from being released by the riveting effect of the coated films through the apertures, but in the case where the aperture ratio is too large, there are some cases where the adhesion strength is rather decreased since the contact area between the coated films and the carbonaceous substance is decreased. Furthermore, in order to improve the adhesion property with the active material layer, the surface of the current collector may be previously subjected to a surface roughening treatment. Examples of the method for roughening the surface include a blast treatment, a method of rolling with a roll with a roughened surface, a mechanical grinding method of grinding the surface of the current collector with a grinding cloth having abrasive particles fixed thereon, grinding stone, emery buff, a wire brush having copper wires, and the like, an electrolyte grinding method, and a chemical grinding method.

The anode containing the current collector having thereon the active material layer can be produced in such a manner that the anode material for a lithium secondary battery is dissolved in a solvent capable of dissolving the binder to form a dispersed paint, and paint is coated on the current collector, followed by drying.

Examples of the solvent used upon forming the active material layer include an organic solvent, such as N-methylpyrrolidone and dimethylformamide, and an aqueous solvent, such as water, and preferably N-methylpyrrolidone. The concentration of the solvent in the paint is more than 10% by weight, generally 20% by weight or more, preferably 30% by weight or more, and more preferably 35% by weight or more. The upper limit thereof is generally 90% by weight or less, and preferably 80% by weight or less. In the case where the solvent concentration is too small, there are some cases where coating is difficultly carried out, and in the case where it is too large, there are some cases where the thickness of the coated film is difficult to increase, and the stability of the paint is deteriorated.

An ordinary dispersing machine can be used for dispersing the paint, and a planetary mixer, a ball mill, a sand mill, a biaxial kneading machine and the like may be used.

The coating machine for coating the paint on the current collector is not particularly limited, and preferred examples thereof include a slide coater, an extrusion type die coater, a reverse roll, a gravure coater, a knife coater, a kiss coater, a microgravure coater, a rod coater and a blade coater, preferably a die coater, a blade coater and a knife coater, and most preferably an extrusion type die coater under consideration of the viscosity of the paint and the thickness of the coated film, and a blade coater from the standpoint of convenience.

After coating the paint on the current collector, the coated film is dried, for example, at a temperature of 120° C. for a period of about 10 minutes to form the active material layer.

The thickness of the active material layer is generally 10 μm or more, and more preferably 20 μm or more, and is generally 200 μm or less, and preferably 150 μm or less. In the case where the thickness of the active material layer is too thin, the capacity of the battery is too small. In the case where it is too thick, on the other hand, the rate characteristics are lowered.

The electrolyte used in the lithium secondary battery is generally formed by dissolving a lithium salt as a supporting electrolyte in a nonaqueous solvent.

As the nonaqueous solvent, a solvent having a relatively high dielectric constant is preferably used. Specific examples thereof include a cyclic carbonate compound, such as ethylene carbonate and propylene carbonate, a non-cyclic carbonate, such as dimethyl carbonate, diethyl carbonate and ethylmethyl carbonate, a glyme compound, such as tetrahydrofuran, 2-methyltetrahydrofuran and dimethoxyethane, a lactone compound, such as γ-butyrolactone, a sulfur compound, such as sulfolane, and a nitrile compound, such as acetonitrile. The nonaqueous solvent may be used in combination of plural kinds thereof.

The nonaqueous solvent preferably has a viscosity of 1 mPa·s or more.

Examples of the lithium salt as the supporting electrolyte contained in the electrolyte solution include $LiPF_6$, $LiAsF_6$, $LiSbF6$, $LiBF_4$, $LiClO_4$, $LiI$, $LiBr$, $LiCl$, $LiAlCl$, $LiHF_2$, $LiSCN$ and $LiSO_3CF_2$. Among these, $LiPF_6$ and $LiClO_4$ are particularly preferred. The content of the supporting electrolyte in the electrolyte solution is generally from 0.5 to 2.5 mole/L.

Various kinds of additives may be added to the electrolyte solution for improving the performance of the battery depending on necessity.

The electrolyte is present in the cathode oxide and the anode and between the cathode and the anode, and it is preferred that a support, such as a porous film, is inserted between the cathode and the anode for preventing the cathode and the anode from forming short circuit. As the porous film, a film formed of a polymer resin and a thin film formed of powder and a binder are preferably used, and a porous film formed of polyethylene, polypropylene or the like is more preferred.

The cathode of the lithium secondary battery generally has a current collector having thereon a cathode active material layer containing a cathode active material. Examples of the cathode active material used include a complex oxide of lithium and a transition metal, and specific examples thereof include a lithium-nickel complex oxide, such as $LiNiO_2$ and $LiNiCoO_2$, a lithium-cobalt complex oxide, such as $LiCoO_2$, and a lithium-manganese complex oxide, such as $LiMn_2O_4$. The transition metal site of the complex oxide may be partially substituted by another element. The lithium-transition metal complex oxide can be improved in stability of the crystalline structure by substituting a part of the transition metal by another element. Examples of the element substituting a part of the transition metal site (hereinafter, referred to as a substituting element) include Al, Ti, V, Cr, Mn, Fe, Co, Li, Ni, Cu, Zn, Mg, Ga and Zr, and preferably Al, Cr, Fe, Co, Li, Ni, Mg and Ga, and further preferably Al. The transition metal site may be substituted by two or more kinds of elements. The substitution degree by the substituting element is generally 2.5% by mole or more based on the transition metal as the base, and more preferably 5% by mole or more based on the transition metal as the base, and is generally 30% by mole or less based on the transition metal as the base, and more preferably 20% by mole or less based on the transition metal as the base. In the case where the substitution degree is too small, there are some cases where the crystalline structure cannot be sufficiently stabilized, and in the case where it is too large, there are some cases where the capacity as a battery is lowered. Among the lithium-transition metal complex oxides, a lithium-cobalt complex oxide and a lithium-nickel complex oxide are more preferred, and $LiCoO_2$ is particularly preferred. The particle diameter of the cathode active material is generally 1 μm or more since excellent battery characteristics, such as cycle characteristics, can be obtained, and is generally 30 μm or less, and preferably 10 μm or less.

The cathode is generally contains a current collector formed thereon an active material layer containing the cathode active material and a binder. The species of the binder used in the cathode and the method of forming the active material layer may be the same as those in the anode.

Examples of the material for the current collector in the cathode generally include a metal, such as aluminum, copper, nickel, tin and stainless steel, and an alloy of the metals. In this case, aluminum is generally used as the current collector of the cathode. The shape of the current collector is not particularly limited, and examples thereof include a plate form and a mesh form. The thickness of the current collector is generally 1 μm or more, and is generally 50 μm or less, and preferably 30 μm or less. In the case where it is too thin, the mechanical strength is lowered, but in the case where it is too thick, the size of the battery is increased, and the space occupied by the current collector in the battery is increased, so as to decrease the energy density of the battery. The other elements than the current collector and the thickness may be the same as those in the current collector for the anode.

The battery elements including the cathode, the anode and the electrolyte are housed in a housing. Examples of the battery element include a wound accumulated body, which is obtained by accumulating the cathode and the anode through an electrolyte solution layer, an accumulated body obtained by accumulating the cathode and the anode through an electrolyte solution layer in a flat plate form, and an accumulated body obtained by accumulating plural pieces of the battery elements obtained by accumulating in a flat plate form.

Examples of the housing, in which the battery elements are housed, include a metallic can for a coin cell and a dry battery, and a housing having shape variability.

Examples of an electric equipment, in which the lithium secondary battery is used as an electric power source, include a portable personal computer, a stylus-operated personal computer, a mobile personal computer, an electronic book player, a portable telephone, a cordless handset, a pager, a handy terminal, a portable facsimile machine, a portable duplicator, a portable printer, a personal stereo, a video cam, a liquid crystal television, a handy cleaner, a portable CD player, a mini-disk player, an electric shaver, a radio transceiver, an electronic organizer, an electronic calculator, a memory card, a portable tape recorder, a radio receiver, a backup electric power source, an electric motor, a lighting fixture, a toy, a game machine, a load conditioner, a clock, a strobe light, a camera, and a medical equipment (such as a heart pacer, a hearing aid and a shoulder massager). The lithium secondary battery can also be used as an electric power source for an electric vehicle.

EXAMPLE

The invention will be described in more detail with reference to examples, but the invention is not construed as being limited to the following examples unless they go beyond the substance of the invention.

Example 1

[Surface Treatment of Carbonaceous Substance]

Fullerene oxide produced by subjecting $C_{60}$ to oxidation reaction (the oxygen number bonded to fullerene was from 1 to 9) was used as a fullerene compound. Natural graphite having a particle diameter of 23.8 μm and a specific surface area of 5.0 m$^2$/g was used as a carbonaceous substance.

The fullerene oxide was dissolved in 1,2,4-trimethylbenzene to a solid content of 0.01% by weight, and 100 g of the solution was placed in a glass vessel having an internal capacity of 300 mL. 9.99 g of the natural graphite was further placed in the vessel, and after stirring for about 12 hours, the mixture was dried by heating at 60° C. to obtain natural graphite having present on the surface thereof the fullerene oxide to a modification ratio of 0.1% by weight (hereinafter, sometimes simply referred to as modified powder).

It was confirmed by observation with a scanning electron microscope (hereinafter, simply referred to as SEM) that the fullerene oxide was present on the surface of the modified powder. The fullerene oxide was present as being dispersed on the surface of the graphite.

[Production of Anode]

90 parts by weight of the modified powder as an anode active material, 10 parts by weight of a polyvinylidene fluoride resin (KF Polymer #1300, produced by Kureha Chemical Industry Co., Ltd.) and 150 parts by weight of N-methyl-2-pyrrolidone were kneaded to obtain an anode paint.

The anode paint was coated, immediately after production, on a copper foil (thickness: 20 μm) with a doctor blade (blade coater) and dried, followed by subjecting to a roll press treatment at a linear pressure of 100 kN/m, to obtain an anode.

[Production of Battery]

The anode was punched out to a diameter of 13 mm, and the battery characteristics were evaluated with a coin cell.

Upon producing the coin cell, a Li metallic foil (thickness: 0.5 mm, diameter: 14 mm) as a counter electrode, an electrolyte solution and a separator were used. The electrolyte solution and the separator used were as follows.

The electrolyte solution contains ethylene carbonate and dimethyl carbonate (both produced by Mitsubishi Chemical Corp.) in a proportion of 1/1 (volume %) and $LiPF_6$ as a lithium salt. The concentration of the lithium salt was 1 mole/L.

The separator was a polyethylene sheet having a thickness of 16 μm (produced by Tonen Chemical Corp.).

Example 2

A battery was produced in the same manner as in Example 1 except that artificial graphite having a particle diameter of 18 μm and a specific surface area of 4.7 $m^2/g$ was used as the carbonaceous substance.

Example 3

A battery was produced in the same manner as in Example 1 except that artificial graphite having a particle diameter of 19 μm and a specific surface area of 0.7 $m^2/g$ was used as the carbonaceous substance.

Comparative Example 1

An electrode was produced in the same manner as in Example 1 except that the fullerene oxide was not made present on the surface of the carbonaceous substance, and the battery characteristics were evaluated.

Comparative Example 2

An electrode was produced in the same manner as in Example 2 except that the fullerene oxide was not made present on the surface of the carbonaceous substance, and the battery characteristics were evaluated.

Comparative Example 3

An electrode was produced in the same manner as in Example 3 except that the fullerene oxide was not made present on the surface of the carbonaceous substance, and the battery characteristics were evaluated.

Comparative Example 4

An electrode was produced in the same manner as in Example 1 except that the same carbonaceous substance used in Example 1 was used, but the surface thereof was modified with fullerene hydride, and the battery characteristics were evaluated.

The method for making fullerene hydride present on the surface of the carbonaceous substance was as follows.

Fullerene hydride was obtained by subjecting $C_{60}$ to reduction reaction. As the carbonaceous substance, natural graphite having a particle diameter of 23.8 μm and a specific surface area of 5.0 $m^2/g$ was used as similar to Example 1.

The fullerene hydride was dissolved in decahydronaphthalene (a cis/trans mixture, produced by Tokyo Kasei Kogyo Co., Ltd.) to a solid content of 0.01% by weight, and 100 g of the solution was placed in a glass vessel having an internal capacity of 300 mL. 9.99 g of the natural graphite was further placed in the vessel, and after stirring for about 12 hours, the mixture was dried by heating at 60° C. to obtain natural graphite having present on the surface thereof the fullerene oxide to a modification ratio of 0.1% by weight.

It was confirmed by observation with an SEM that the fullerene hydride was present on the surface of the modified powder.

Test Example

The batteries obtained in Examples 1 to 3 and Comparative Examples 1 to 4 were evaluated for battery characteristics.

The battery characteristics were evaluated in such a manner that the coin cells were charged and discharged, and the first cycle charge capacity, the first cycle discharge capacity and the initial efficiency were measured. The charging conditions were constant current charging with a current value of 0.3 $mA/cm^2$ until 3 mV, and then constant voltage charging until 0.03 $mA/cm^2$. The discharge conditions were constant current discharging at 0.3 $mA/cm^2$ until 1.5 V. The initial efficiency was calculated by (first cycle discharge capacity)/(first cycle charge capacity).

The first cycle charge capacity, the first cycle discharge capacity and the initial efficiency thus measured are shown in Table 1.

TABLE 1

| | First cycle charge capacity (mAh/g) | First cycle discharge capacity (mAh/g) | Initial efficiency (%) | Note |
|---|---|---|---|---|
| Example 1 | 384 | 356 | 92.7 | |
| Comparative Example 1 | 387 | 354 | 91.3 | not treated |
| Comparative Example 4 | 401 | 356 | 88.6 | surface modified with fullerene hydride |
| Example 2 | 383 | 356 | 93.0 | |
| Comparative Example 2 | 361 | 332 | 92.0 | not treated |
| Example 3 | 380 | 348 | 91.6 | |
| Comparative Example 3 | 369 | 323 | 87.7 | not treated |

It is understood from Table 1 that in both cases of natural graphite and artificial graphite, the initial efficiency is improved by about from 1 to 4% by treating the surface with fullerene oxide. It is found from the results of Comparative Examples 1 and 4 that in the case where the surface of natural graphite is modified with fullerene hydride, the initial efficiency is lowered by about 3% in comparison to the case of non-treated. This means nothing else that a fullerene derivative having a group having a molecular weight of 6 or more (oxygen atom in Examples 1 to 3, molecular weight: 16)) is effective for improving the battery performance.

Example 5

(1) Fullerene Compound Supporting Step (Surface Treatment with Fullerene Compound)

5 g of graphite (BET surface area: 4.2 m$^2$/g, average particle diameter: 15 μm) as a carbonaceous substance was weighed in a 50 cc-beaker, to which 0.5 mL of a 1,2,4-trimethylbenzene solution of fullerene $C_{60}$ (concentration: 10 mg/mL) was added, and 3.5 mL of 1,2,4-trimethylbenzene was added, followed by well stirring, to obtain a paste mixture. The mixture was dried in an oven at 120° C. under a nitrogen stream for 3 hours to remove the solvent completely, and thus powder 1A was obtained.

(2) Crosslinking Step or Chemically Bonding Step (Insolubilizing Treatment)

1 g of the powder 1A was weighed in a 50 cc-beaker and heated at 350° C. under an air stream for 3 hours to attain an insolubilizing treatment, and thus powder 1B was obtained.

(3) Production of Anode 90 parts by weight of the surface-treated graphite (powder 1B) as an anode active material, 10 parts by weight of polyvinylidene fluoride and 150 parts by weight of N-methyl-2-pyrrolidone were mixed to obtain an anode paint.

The paint was coated, within 1 hour from the production, on a copper foil (thickness: 10 μm) with a doctor blade (blade coater) and dried, followed by subjecting to a roll press treatment at a linear pressure of 100 kN/m, to obtain an anode. It was then punched to a diameter of 13 mm to obtain an anode for a coin cell.

(4) Production of Battery

Upon producing the coin cell, a Li metallic foil (thickness: 0.5 mm, diameter: 14 mm) as a counter electrode, an electrolyte solution and a separator were used. The electrolyte solution and the separator used were as follows.

The electrolyte solution contains ethylene carbonate and dimethyl carbonate (both produced by Mitsubishi Chemical Corp.) in a proportion of 1/1 (volume %) as non-aqueous solvent and $LiPF_6$ as a lithium salt. The concentration of the lithium salt was 1 mole/L.

The separator was a polyethylene sheet having a thickness of 16 μm (produced by Tonen Chemical Corp.).

Example 6

A battery was produced in the same manner as in Example 5 except that upon producing an anode, the anode paint was allowed to stand for 1 week after the production, and the paint was again stirred and then coated to produce an electrode.

Example 7

A battery was produced in the same manner as in Example 5 except that in the fullerene compound supporting step, 0.5 mL of a 1,2,4-trimethylbenzene solution of fullerene $C_{70}$ (concentration: 10 mg/mL) was used instead of $C_{60}$.

Example 8

A battery was produced in the same manner as in Example 7 except that upon producing an anode, the anode paint was allowed to stand for 1 week after the production, and the paint was again stirred and then coated to produce an electrode.

Example 9

A battery was produced in the same manner as in Example 5 except that in the fullerene compound supporting step, 3 mL of a 1,2,4-trimethylbenzene solution of fullerene $C_{70}$ (concentration: 5 mg/mL) was added instead of $C_{60}$, and 1.5 mL of 1,2,4-trimethylbenzene was added.

Example 10

A battery was produced in the same manner as in Example 5 except that in the fullerene compound supporting step, 0.5 mL of a 1,2,4-trimethylbenzene solution of a mixture of fullerene $C_{60}$ and fullerene $C_{70}$ (mixed fullerene $C_{60}/C_{70}$=3/1) (concentration: 10 mg/mL) was added instead of $C_{60}$, and 3.5 mL of 1,2,4-trimethylbenzene was added.

Example 11

A battery was produced in the same manner as in Example 5 except that in the fullerene compound supporting step, 1 mL of a 1,2-dimethylbenzene solution of fullerene $C_{60}$ (concentration: 5 mg/mL) was added, 4 mL of toluene was added, and the insolubilizing treatment was effected at 300° C. in an air stream for 3 hours.

Comparative Example 5

A battery was produced in the same manner as in Example 5 except that fullerene $C_{60}$ was not used (the steps of (1) and (2) in Example 5 were not carried out), and graphite was used as it is as an anode active material.

Reference Example 1

A battery was produced in the same manner as in Example 5 except that the insolubilizing treatment was not carried out.

Example 12

(1) Fullerene Compound Supporting Step (Surface Treatment with Fullerene Compound)

5 g of graphite (BET surface area: 4.2 m$^2$/g, average particle diameter: 15 μm) as a carbonaceous substance was weighed in a 100 cc-beaker, to which 0.5 mL of an N-methyl-2-pyrrolidone (NMP) solution of fullerene $C_{60}$ (OH)$_n$ (n represents a center value of 10, hereinafter, the hydroxyl group-introduced fullerene $C_{60}$ is referred to as $C_{60}$ hydroxide) (concentration: 10 mg/mL) was added, and 1.5 mL of NMP and 2 mL of dimethylformamide (DMF) were added, followed by well stirring, to obtain a paste mixture. The mixture was dried in an oven at 120° C. under a nitrogen stream for 3 hours to remove the solvent completely, and thus powder 2A was obtained.

(2) Crosslinking Step or Chemically Bonding Step (Insolubilizing Treatment)

1 g of the powder 8A was weighed in a 100 cc-beaker and heated at 350° C. under a nitrogen stream for 3 hours to attain an insolubilizing treatment, and thus powder 2B was obtained.

(3) Production of Anode

The same procedures as in Example 5 were carried out except that the powder 2B was used.

(4) Production of Battery

The same procedures as in Example 5 were carried out except that an electrode using the powder 2B was used.

Example 13

A battery was produced in the same manner as in Example 12 except that the anode paint was allowed to stand for 1 week after the production, and the paint was again stirred and then coated to produce an electrode.

Example 14

A battery was produced in the same manner as in Example 12 except that in the fullerene compound supporting step, 0.5 mL of an NMP solution of a hydroxyl group-introduced fullerene $C_{70}(OH)_n$ (n represents a center value of 12, hereinafter, referred to as $C_{70}$ hydroxide) (concentration: 10 mg/mL) was used.

Example 15

A battery was produced in the same manner as in Example 14 except that the anode paint was allowed to stand for 1 week after the production, and the paint was again stirred and then coated to produce an electrode.

Test Example

The batteris obtained in Examples 5 to 16 and Comparative Examples 4 to 5 were evaluated for battery characteristics.

The battery characteristics were evaluated in such a manner that the coin cells were charged and discharged, and the initial efficiency was calculated from the first cycle charge capacity and the first cycle discharge capacity. The charging conditions were constant current charging with a current value of 0.3 mA/cm² until 3 mV, and then constant voltage charging until 0.03 mA/cm². The discharge conditions were constant current discharging at 0.3 mA/cm² until 1.5 V. The initial efficiency was calculated by (first cycle discharge capacity)/(first cycle charge capacity).

The initial efficiency thus measured is shown in Table 2.

TABLE 2

| | Surface treatment | | Insolubilizing treatment | | Formation of electrode | Battery characteristics |
|---|---|---|---|---|---|---|
| | Species of treatment | Treated amount (% by weight) | Atmosphere | Temperature | Time of coating after production of the paint | Initial efficiency (%) |
| Example 5 | $C_{60}$ | 0.1 | air | 350 | within 1 hour | 93.1 |
| Example 6 | $C_{60}$ | 0.1 | air | 350 | after 1 week | 93.4 |
| Example 7 | $C_{70}$ | 0.1 | air | 350 | within 1 hour | 93.4 |
| Example 8 | $C_{70}$ | 0.1 | air | 350 | after 1 week | 92.8 |
| Example 9 | $C_{70}$ | 0.3 | air | 350 | within 1 hour | 93.1 |
| Example 10 | $C_{60} + C_{70}$ | 0.1 | air | 350 | within 1 hour | 93.3 |
| Example 11 | $C_{60}$ | 0.1 | air | 300 | within 1 hour | 92.9 |
| Example 12 | $C_{60}$ hydroxide | 0.1 | nitrogen | 350 | within 1 hour | 93.3 |
| Example 13 | $C_{60}$ hydroxide | 0.1 | nitrogen | 350 | after 1 week | 93.0 |
| Example 14 | $C_{70}$ hydroxide | 0.1 | nitrogen | 350 | within 1 hour | 92.9 |
| Example 15 | $C_{70}$ hydroxide | 0.1 | nitrogen | 350 | after 1 week | 92.6 |
| Example 16 | $C_{60}$ hydroxide | 0.1 | nitrogen | 300 | within 1 hour | 93.0 |
| Comparative Example 5 | none | 0 | — | — | within 1 hour | 91.5 |
| Reference Example 1 | $C_{60}$ | 0.1 | — | — | within 1 hour | 90.3 |

Example 16

A battery was produced in the same manner as in Example 12 except that the following conditions were employed in the fullerene compound supporting step, and the following conditions were employed in the crosslinking and chemically bonding step.

(1) Fullerene Compound Supporting Step (Surface Treatment with Fullerene Compound)

4 g of graphite was weighed in a 100 cc-beaker, to which 0.8 mL of an NMP solution of $C_{60}$ hydroxide (concentration: 5 mg/mL) was added, and 3.2 mL of NMP was added, followed by well stirring, to obtain a paste mixture. The mixture was dried in an oven at 120° C. under a nitrogen stream for 5 hours to remove the solvent completely, and thus powder 3A was obtained.

(2) Crosslinking Step or Chemically Bonding Step (Insolubilizing Treatment)

The conditions for the insolubilizing treatment were at 300° C. under a nitrogen stream for 3 hours.

It is understood from Table 2 that the initial efficiency is improved by about from 1 to 3% by effecting the insolubilizing treatment. It is also understood from the results of Example 6 that in the case where NMP, which is known as the solvent dissolving $C_{60}$ (for example, the dissolution amount of $C_{60}$ in NMP is 0.89 mg/mL as disclosed in R. S. Ruof, et al., J. Phys. Chem., vol. 97, pp. 3379-3383 (1993)), is used as the solvent for producing the anode, the fullerene having been subjected to the insolubilizing treatment present on the surface of the graphite is not eluted, and the improvement effect for the battery performance is sufficiently exerted even in the battery production after 1 week.

It is also understood from the results of Examples 12 to 16 that the effect is obtained, even when the same solvent as the solvent (NMP) capable of dissolving the fullerene compound used in the fullerene compound supporting step is used as the solvent for the paint for producing the anode.

As shown by Reference Example 1, on the other hand, sufficient effect cannot be obtained by treating the surface of the carbonaceous substance with $C_{60}$. This is partly caused by the fact that $C_{60}$ is soluble in NMP as the solvent of the paint. In other words, there is such a possibility that the fullerene compound can be stably present on the surface of the carbonaceous substance by producing the anode immediately after the production of the anode paint containing the anode material, but it is considered that in the case where the time lapses after producing the anode paint as in Reference Example 1, $C_{60}$ is eluted from the surface of the carbonaceous substance to NMP as the solvent for the paint to lower the effect of making the fullerene compound present on the surface of the carbonaceous substance.

Furthermore, it is considered that another reason why the sufficient effect cannot be obtained by treating the surface of the carbonaceous substance with $C_{60}$ is that $C_{60}$ on the surface of the anode, which is in a reducing atmosphere upon charging in the battery, is reduced, and a molecular species soluble in the electrolyte solution is formed and eluted into the electrolyte solution. Accordingly, the insolubilizing treatment of the fullerene compound also provides a solution for other factors than the solvent for the paint.

Reference Example 2

In order to investigate as to whether or not the fullerene compound was crosslinked or bonded to the substrate in the crosslinking step or the chemically bonding step (insolubilizing treatment) in Examples 5 to 16, the following experiment was carried out by using $C_{60}$ hydroxide as the fullerene compound.

(1) Dehydration by Heating

Powder of $C_{60}$ hydroxide was dried at 120° C. for 3 hours by using a vacuum drier for removing water adsorbed on the surface, and then 5 mg thereof was fractionated and measured for water content released upon heating to prescribed temperatures with a Karl Fischer water content meter of a heating and released water detecting type. As the heating and released water detecting type Karl Fischer water content meter, VA-06, produced by Mitsubishi Chemical Corp., was used.

The water contents thus measured are shown in Table 3.

TABLE 3

| Heated temperature | Released water content (% by weight) | Concentration of solution (mg/mL) |
|---|---|---|
| 120° C. | 0.14 | 0.029 |
| 200° C. | 0.16 | 0.010 |
| 300° C. | 2.4 | 0.001 |

(2) Confirmation of Solubility of Heated $C_{60}$ Hydroxide 1 mg of $C_{60}$ hydroxide thus heated and dehydrated at the aforementioned temperatures was weighed in 20 cc-sample tubes, respectively, to which 10 mL of propylene carbonate was added, followed by well stirring. After leaving at rest for 24 hours, the concentration of the supernatant liquid was quantitatively determined with an ultraviolet-visible absorption spectrometer. The concentration of the solution upon being completely dissolved became 0.1 mg/mL. The saturated solubility of $C_{60}$ hydroxide in propylene carbonate was 0.48 mg/mL, and thus the charged conditions thus employed was a sufficient composition for completely dissolving $C_{60}$ hydroxide thus put in. The measurement of an ultraviolet absorption spectrum was carried out by using an ultraviolet-visible absorption analyzer (Ultraviolet-visible Spectrometer UV-1650-PC, produced by Shimadzu Corp.).

The concentrations of the solutions thus measured are shown in Table 3.

The proportion of hydroxyl groups occupied in $C_{60}$ hydroxide having about 10 hydroxyl groups added thereto used in the experiment is about 19% by weight. It is assumed in the case of dehydration condensation that one water molecule is released from two hydroxyl groups to form an ether bond, and the water thus released is about 10% by weight. The water contents thus detected are lower than that value, and the following three points can be considered as the reason thereof. Firstly, not all the hydroxyl groups contribute to the formation of crosslinking, secondly, there is such a possibility that apart of the hydroxyl groups are already reacted upon vacuum drying at 120° C. for 3 hours for removing water adsorbed on the surface, and thirdly, there is such a possibility that unreacted hydroxyl groups are reacted at a higher temperature.

On the other hand, the concentration of the solution becomes 0.1 mg/mL when $C_{60}$ hydroxide is completely dissolved in propylene carbonate, and it is understood from the aforementioned measurement that the dissolved amount is decreased when the temperature is increased.

It is understood that, upon heating, $C_{60}$ hydroxide is dehydrated, and $C_{60}$ hydroxide is condensed to each other to form crosslinking, from the fact that the water content released is increased upon increasing the heating temperature, and the dissolution concentration of $C_{60}$ hydroxide in propylene carbonate is decreased upon increasing the heating temperature.

Example 17

(1) Fullerene Compound Supporting Step (Surface Treatment with Fullerene Compound)

5 g of graphite (BET surface area: 4.2 m$^2$/g, average particle diameter: 15 μm) as a substrate was weighed in a 50 cc-beaker, to which 3 mL of a 1,2-dimethylbenzene solution of fullerene $C_{60}$ (concentration: 5 mg/mL) was added, and 2 mL of toluene was added, followed by well stirring, to obtain a paste mixture. The mixture was dried in an oven at 90° C. under a nitrogen stream for 2 hours, and vacuum-dried by using a vacuum drier at 120° C. for 3 hours to remove the solvent completely, and thus powder 22A was obtained.

(2) Crosslinking Step or Chemically Bonding Step (Insolubilizing Treatment)

1 g of the powder 22A was weighed in a 50 cc-beaker and heated at 300° C. under an air stream for 3 hours to attain crosslinking and/or bonding to the surface of the substrate, and thus powder 22B was obtained.

Powder 22C was obtained by changing the heating conditions to 350° C. under an air stream for 3 hours.

(3) Evaluation of Insolubilization 0.1 g of each of the powder 22A, the powder 22B and the powder 22C were weighed in 5 cc-sample tubes, respectively, to which 2 mL of NMP was added, followed by well stirring. After leaving at rest for 24 hours, the supernatant liquid was collected and measured for an ultraviolet absorption spectrum, and the concentration of $C_{60}$ was quantitatively determined by comparing the calibration line in an NMP solution. The quantitative determination of the concentration was appropriately effected at times of 120 hours, 144 hours, 360 hours, 624 hours and 960 hours. The measurement of an ultraviolet absorption spectrum was carried out by using an ultraviolet-visible absorption analyzer (Ultraviolet-visible Spectrometer UV-1650-PC, produced by Shimadzu Corp.).

Figure 3:
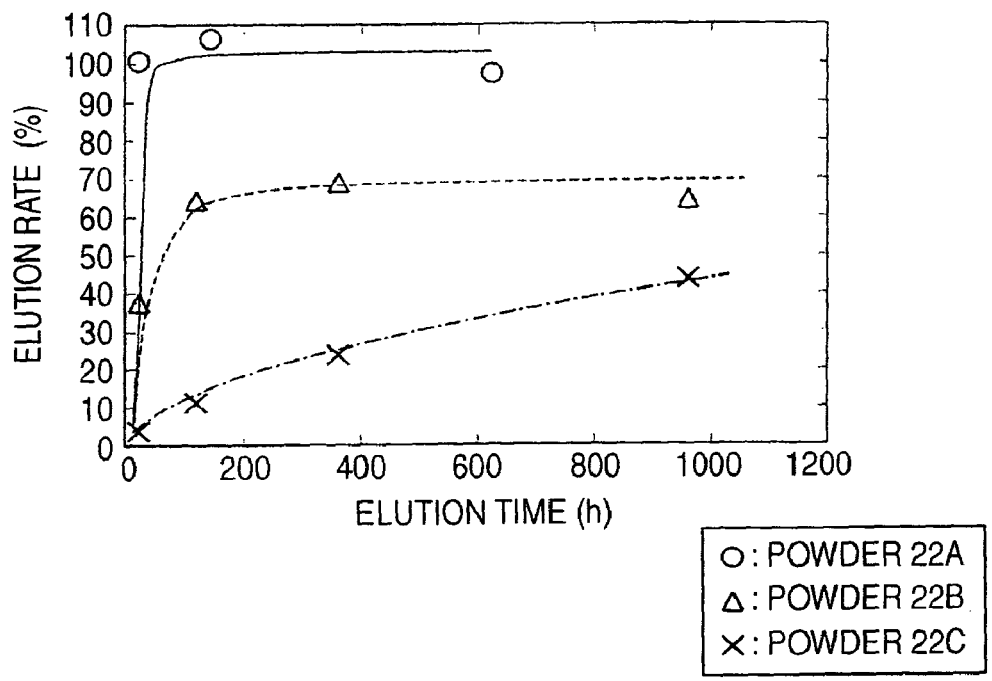
FIG. 3 shows a time dependency of an elution amount obtained in Example 17.

In the case where $C_{60}$ thus treated was entirely eluted, the concentration of the $C_{60}$ solution in the sample tube became 0.15 mg/mL as the treated amount of $C_{60}$ to the powder was 3 mg/g, from which the concentration thus measured was converted to the elution rate. The time dependency of the resulting elution rate thus obtained is shown in FIG. 3. The elution amounts after 24 hours are shown in Table 4.

TABLE 4

| Sample | Elution amount after 24 hours (mg/g) |
|---|---|
| Powder 22A | 3.02 |
| Powder 22B | 1.13 |
| Powder 22C | 0.11 |

Example 18

(1) Fullerene Compound Supporting Step (Surface Treatment with Fullerene Compound)

4 g of graphite (BET surface area: 4.2 m$^2$/g, average particle diameter: 15 μm) as a substrate was weighed in a 100 cc-beaker, to which 2.4 mL of an NMP solution of $C_{60}$ hydroxide (concentration: 5 mg/mL) was added, and 1.6 mL of NMP was added, followed by well stirring, to obtain a paste mixture. The mixture was dried in an oven at 120° C. under a nitrogen stream for 5 hours, and vacuum-dried by using a vacuum drier at 120° C. for 1 hour to remove the solvent completely, and thus powder 23A was obtained.

(2) Crosslinking Step or Chemically Bonding Step (Insolubilizing Treatment)

1 g of the powder 23A was weighed in a 100 cc-beaker and heated at 300° C. under a nitrogen stream for 3 hours to attain crosslinking and/or bonding to the surface of the substrate, and thus powder 23B was obtained.

Powder 23C was obtained by changing the heating conditions to 400° C. under a nitrogen stream for 3 hours.

(3) Evaluation of Insolubilization 0.1 g of each of the powder 23A, the powder 23B and the powder 23C were weighed in 5 cc-sample tubes, respectively, to which 2 mL of NMP was added, followed by well stirring. After leaving at rest for 24 hours, the supernatant liquid was collected and measured for an ultraviolet absorption spectrum, and the concentration of $C_{60}$ hydroxide was quantitatively determined by comparing the calibration line in an NMP solution. The quantitative determination of the concentration was appropriately effected at times of 120 hours, 144 hours, 360 hours, 624 hours and 960 hours. The measurement of an ultraviolet absorption spectrum was carried out by using an ultraviolet-visible absorption analyzer (Ultraviolet-visible Spectrometer UV-1650-PC, produced by Shimadzu Corp.).

Figure 4:
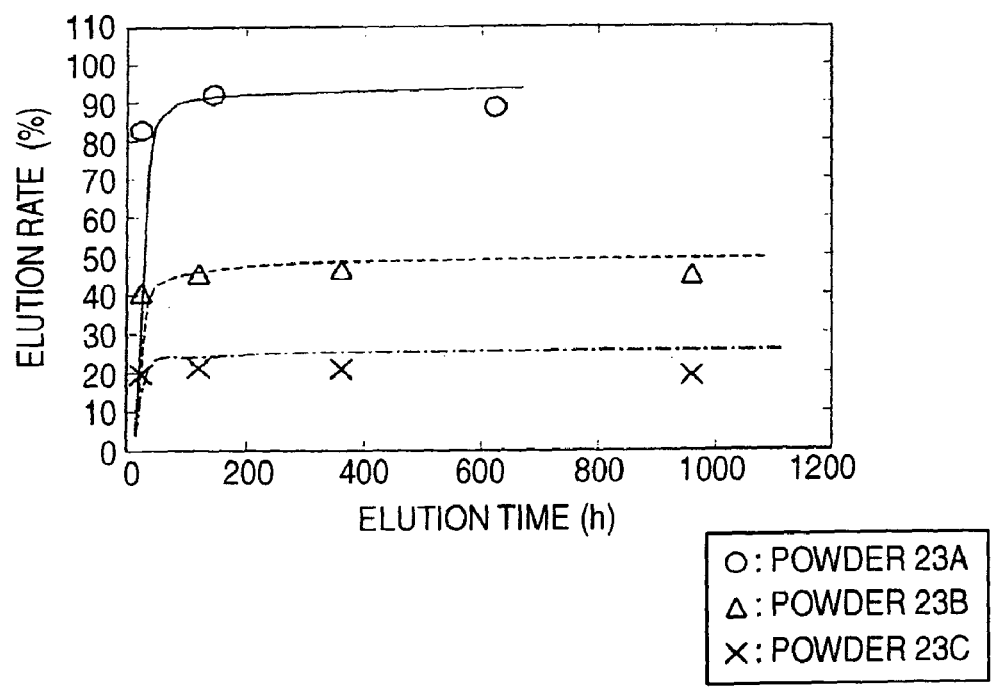
FIG. 4 shows a time dependency of an elution amount obtained in Example 18.

In the case where $C_{60}$ hydroxide thus treated was entirely eluted, the concentration of the $C_{60}$ hydroxide solution in the sample tube became 0.15 mg/mL as the treated amount of $C_{60}$ to the powder was 3 mg/g, from which the concentration thus measured was converted to the elution rate. The time dependency of the resulting elution rate thus obtained is shown in FIG. 4. The elution amounts after 24 hours are shown in Table 5.

TABLE 5

| Sample | Elution amount after 24 hours (mg/g) |
|---|---|
| Powder 23A | 2.48 |
| Powder 23B | 1.21 |
| Powder 23C | 0.59 |

INDUSTRIAL APPLICABILITY

According to the invention, a fullerene compound is present on a surface of a carbonaceous substance, which is generally used as an anode active material of a lithium secondary battery, whereby the lithium secondary battery can be significantly improved in initial efficiency.

Specifically, on a surface of a carbonaceous substance, a fullerene derivative having a group having a formula weight of 6 or more is present, spherical shell structures of a fullerene compound are crosslinked through at least one atom, or a spherical shell structure of a fullerene compound is chemically bonded to the carbonaceous substance through at least one atom, whereby the lithium secondary battery can be significantly improved in initial efficiency.

In particular, spherical shell structures of a fullerene compound are crosslinked through at least one atom, and/or a spherical shell structure of a fullerene compound is chemically bonded to the carbonaceous substance through at least one atom, whereby the fullerene compound can be suppressed from being eluted to an electrolyte solution or an organic solvent used upon producing the anode, so as to provide high stability of the effect of the surface treatment with the fullerene compound. Furthermore, the effect of the surface treatment is not easily lost owing to the high adhesion strength between the fullerene layer and the carbonaceous substance, whereby industrial production thereof can be easily attained.

While the invention has been described with reference to the specific embodiments, it is apparent to a skilled person in the art that various changes and modifications can be made in the invention without departing from the spirits and the scope of the invention.

The invention is based on the Japanese Patent Application filed on Oct. 4, 2002 (Patent Application No. 2002-292747) and the Japanese Patent Application filed on May 8, 2003 (Patent Application No. 2003-130405), and the entire disclosures thereof are incorporated herein by reference.

The invention claimed is:

1. An anode material, which comprises:
   at least one carbonaceous substance in the form of a powder; and
   from 0.01 to 0.3 wt % fullerene, with respect to the amount of said at least one carbonaceous substance,
   wherein said fullerene is chemically bonded to said at least one carbonaceous substance through a compound having at least one atom, and
   said carbonaceous substance is at least one member selected from the group consisting of graphite, carboniferous coke, petroleum coke, a carbide of carboniferous pitch, a carbide of petroleum pitch, needle coke, pitch coke, a carbide of a phenol resin, and a carbide of a crystalline cellulose.

2. The anode material according to claim 1, wherein said fullerene comprises at least one of $C_{60}$ fullerene, $C_{70}$ fullerene, $C_{74}$ fullerene, $C_{76}$ fullerene, $C_{78}$ fullerene, $C_{80}$ fullerene, $C_{82}$ fullerene, $C_{84}$ fullerene, $C_{86}$ fullerene, $C_{88}$ fullerene, $C_{90}$ fullerene, $C_{92}$ fullerene, $C_{94}$ fullerene, $C_{96}$ fullerene, $C_{98}$ fullerene, $C_{100}$ fullerene, a dimer thereof, and a trimer thereof.

3. The anode material according to claim 1, wherein said fullerene comprises a mixture of $C_{60}$ fullerene and $C_{70}$ fullerene.

4. The anode material according to claim 3, wherein said $C_{70}$ fullerene present in an amount of from 5 to 90 parts by weight per 100 parts of said $C_{60}$ fullerene.

5. The anode material according to claim 1, wherein said fullerene present on said surface of said carbonaceous substance is crosslinked with a second fullerene present on said surface of said carbonaceous substance through at least one atom.

6. The anode material according to claim 5, wherein said at least one atom is an oxygen atom.

7. The anode material according to claim 1, wherein an elution amount of said fullerene per unit weight of said anode material is 2 mg/g or less, wherein said elution amount is determined by:
 (1) dissolving 0.1 g of said anode material in 2 mL of trimethylbenzene or N-methylpyrrolidone to prepare a sample solution;
 (2) collecting a supernatant fluid from said sample solution at a temperature of 25±5° C. and at a humidity of 50±15% RH for 24 hours;
 (3) measuring an amount of said fullerene in said supernatant fluid to obtain a measured value;
 (4) converting said measured value to a total elution amount to obtain a converted value; and
 (5) dividing said converted value by 0.1 g.

8. The anode material according to claim 1, wherein said at least one carbonaceous substance has, on a surface thereof, at least one reactive group selected from the group consisting of a hydroxyl group, a thiol group, and a group having an unsaturated double bond.

9. The anode material according to claim 8, wherein said group having an unsaturated double bond is a vinyl group or an allyl group.

10. The anode material according to claim 1, wherein the carbonaceous substance does not contain fullerene.

11. The anode material according to claim 1, wherein said compound having at least one atom is a compound having at least two functional groups and having a formula weight of from 40 to 200.

12. The anode material according to claim 1, wherein said compound having at least one atom is an oxygen atom.

13. A process for producing an anode material according to claim 1, comprising:
 mixing said fullerene and said carbonaceous substance; and
 contacting said fullerene and said carbonaceous substance with said compound having at least one atom to chemically bond said fullerene and said carbonaceous substance.

14. The process according to claim 13, wherein said contacting is carried out at a temperature ranging from 100 to 350° C.

15. The process according to claim 13, wherein said at least one carbonaceous substance has, on a surface thereof, a reactive group selected from the group consisting of a hydroxyl group, a thiol group, and a group having an unsaturated double bond.

16. The process according to claim 15, wherein said group having an unsaturated double bond is a vinyl group or an allyl group.

17. The process according to claim 13, wherein the carbonaceous substance does not contain fullerene.

18. The process according to claim 13, comprising:
 contacting said fullerene and said carbonaceous substance with oxygen or ozone present in an atmosphere to chemically bond said fullerene and said carbonaceous substance at a temperature of from 60 to 1,500° C.

19. The process according to claim 18, wherein a pressure of said oxygen is from $10^{-5}$ to 10 atm.

20. The process according to claim 13, comprising:
 contacting in the gas phase said fullerene and said carbonaceous substance with a compound having at least two crosslinking functional groups and having a formula weight of from 40 to 200 to chemically bond said fullerene and said carbonaceous substance.

21. A battery comprising the anode material according to claim 1, exhibiting an initial efficiency of at least 92.6%.

\* \* \* \* \*